INVENTOR.
JEROME H. LEMELSON

Dec. 12, 1972 J. H. LEMELSON 3,705,953

AUTOMATIC COMMUNICATION SYSTEM

Filed May 12, 1969 9 Sheets-Sheet 2

INVENTOR.

JEROME H. LEMELSON

INVENTOR.
JEROME H. LEMELSON

AUTOMATIC COMMUNICATION SYSTEM

Filed May 12, 1969

9 Sheets-Sheet 4

INVENTOR.
JEROME H.LEMELSON

INVENTOR.
JEROME H. LEMELSON

INVENTOR.
JEROME H. LEMELSON

INVENTOR.
JEROME H. LEMELSON

INVENTOR.
JEROME H. LEMELSON

INVENTOR.
JEROME H. LEMELSON

United States Patent Office 3,705,953
Patented Dec. 12, 1972

3,705,953
AUTOMATIC COMMUNICATION SYSTEM

Jerome H. Lemelson, 85 Rector St., Metuchen, N.J. 08840

Continuation-in-part of application Ser. No. 279,031, Apr. 1, 1963, which is a continuation-in-part of application Ser. No. 723,075, Feb. 28, 1958, now Patent No. 3,084,213, which in turn is a continuation-in-part of application Ser. No. 668,348, Sept. 23, 1957, now Patent No. 3,051,777. This application May 12, 1969, Ser. No. 823,600
Int. Cl. H04n *1/00, 1/28, 1/32*
U.S. Cl. 178—6.6 A 34 Claims

ABSTRACT OF THE DISCLOSURE

An automatic communication system is provided for automatically transmitting information between a master station and one or more receiving stations wherein the communication link is automatically effected. In one form, code signals are automatically generated and are utilized to automatically operate a telephone switching system to connect the output of the master station with one or a plurality of receiving stations. Thereafter, facsimile signals are automatically transmitted on the connected circuits and are recorded. In another form, shortwave communication is automatically effected between a sending station and one or more shortwave receivers of respective receiving stations after which information is automatically transferred on the established communication channels and is recorded automatically.

A feature of the instant invention includes computer means for recording information about receiving stations with which communication channels have not been established after the generation of the proper code signals to effect the establishment of such communication channels. The apparatus includes means for automatically reproducing the same signals, which fail to make the connection the first time an attempt is made, one or a number of times thereafter in additional attempts at effecting the establishment of communication channels with all those receiving stations defined for the operation.

In a form of the instant invention, frames of image information are automatically directed into the scanning field with a video scanning device and are automatically scanned thereafter to generate facsimile signals. A connection signal generating means forms part of the scanning apparatus or is an auxiliary means cooperating with the scanning apparatus.

In another form, all signals, information and connection signals are recorded on a single recording member such as a magnetic tape and are reproduced by respective reproduction transducers as the tape is automatically driven to generate channel connection signals in the proper sequence with associated facsimile signals.

This is a continuation-in-part of copending application Ser. No. 279,031 filed Apr. 1, 1963, for Automatic Communication Systems, now abandoned which was a continuation-in-part of application Ser. No. 723,075 for Facsimile Apparatus which was filed on Feb. 28, 1958, now U.S. Pat. 3,084,213 and Ser. No. 668,348 for Magnetic Recording System filed Sept. 23, 1957, now U.S. Pat. No. 3,051,777.

This invention relates to a system for automatically effecting the transmission of information derived from recordings scanned or reproduced at a sending station, to a remotely situated receiving station without the need for human control to effect such transmission.

If is known in the art to generate information or facsimile signals by providing a photograph or document secured to a drum, which is photoelectrically scanned as the drum rotates and to transmit the resulting picture signal to a receiver on a communication channel established by manually controlled or initiated means. The process is slow and suffers many shortcomings including, in addition to the necessity of having an operator in attendance at either or both ends of the communication channel, generation of slow-scan facsimile signals necessitated by inability of conventional wire or telephone circuits to carry video frequency signals, requirements for manually changing of documents to be scanned, manual adjustment of receiving recording means, failure to immediately establish connections due to circuits in use, etc.

It is a primary object of this invention to provide a new and improved automatic system for rapidly transmitting and recording information such as pictorial document or other forms of information by utilizing wire or short wave communication channels between sending and receiving stations for transmitting both control codes and information signals.

Another object is to provide an improved information or facsimile communication system for rapidly transmitting and recording a plurality of document recordings of information signals.

Another object is to provide an improved system for communicating between recording devices including a plurality of recorders, at least one of which contains recordings certain of which are reproducible to effect one or more control functions relative to automatically establishing a communication link with a remote station, and containing other recordings which are operative, when reproduced, for controlling a recorder at said remote station.

Another object is to provide an automatic facsimile system including automatic means for reproducing documents at a plurality of different locations.

Another object is to provide an improved facsimile system utilizing short wave communication channels for simultaneously transmitting pictorial or document recordings to receivers at different locations and including means for remotely determining if said recordings are received and recorded.

Another object is to provide an improved communication system including means for effecting two-way communication and control between automatic recorders.

Another object is to provide a system of short wave communication between recording and reproduction devices whereby the establishment of a communication link is automatically effected from one station and automatically determined from the same or other station.

Still another object is to provide an automatic signal reproduction, transmission and recording system which is operative whereby one or a plurality of signals recorded on and transducible automatically from a record medium which may comprise a tape or card, which signals may be automatically transmitted to one or a plurality of receiving stations and may also be automatically recorded at each by automatic self-operating means without the need for manual attendance of said apparatus whatsoever.

Still another object is to provide an automatically operating system for the automatic transmission of picture or other information signals by wire or short wave means from a sending station to selected of a plurality of receiving stations by means of a plurality of selection signals or codes each of which is identifiable with an energizes a switching means effecting a communication link with a respective of said receiving stations, said system including means at said sending station for indicating when a respective connection has not been made and recording said indication, and means for indicating when a respective information or picture signal has not been recorded in its entirety at a respective receiving station.

For a clearer understanding of the invention, reference may be made to the following detailed description and the accompanying drawings, in which.

Figure 2:
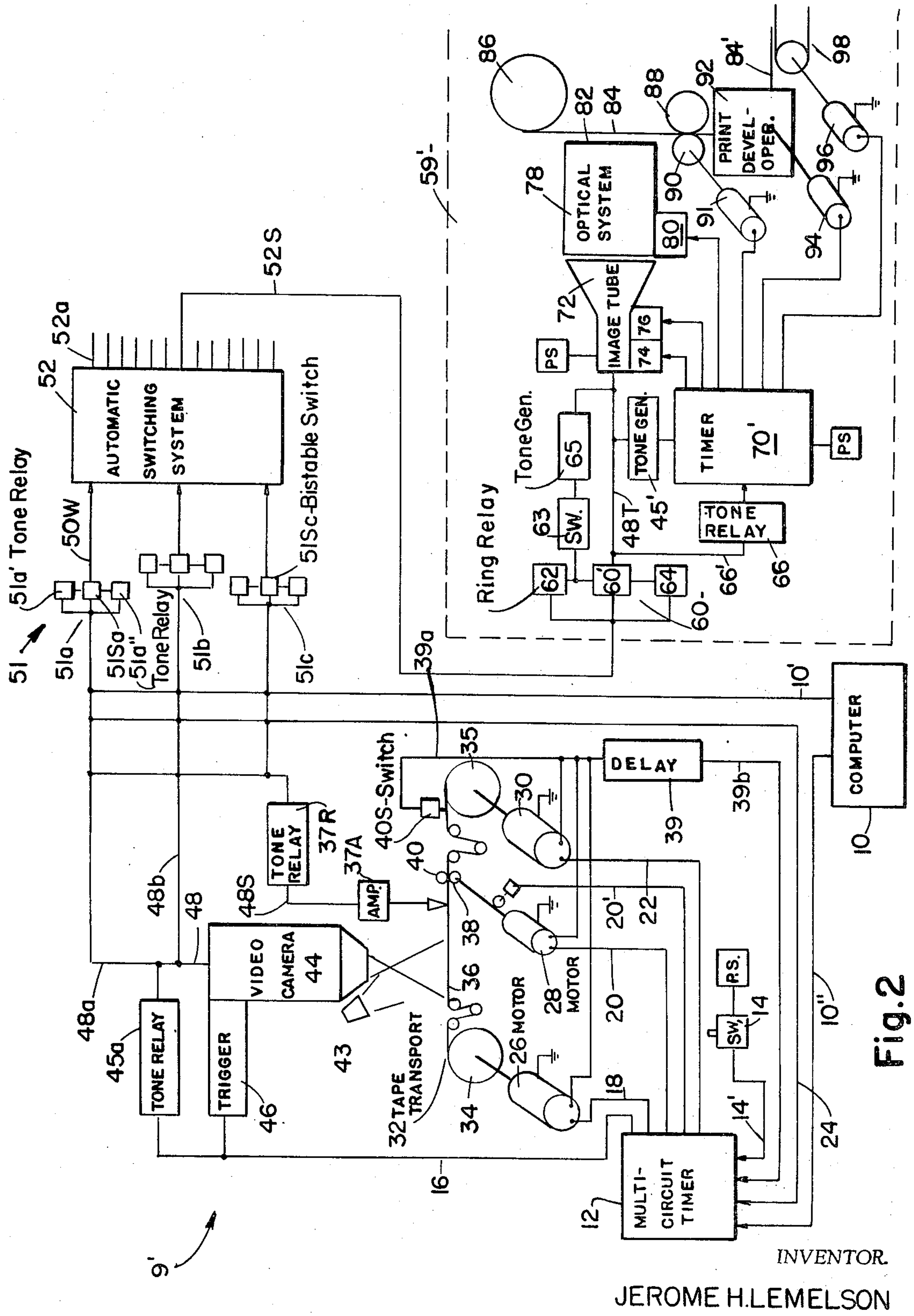
FIG. 2 shows schematically a system similar to that of FIG. 1 wherein the circuit connections are accomplished automatically without manual attendance, and the transmission of a plurality of different image signals to a plurality of selected receivers and associated printing mechanisms is also accomplished automatically without human attendance or direction.
Figure 2A:
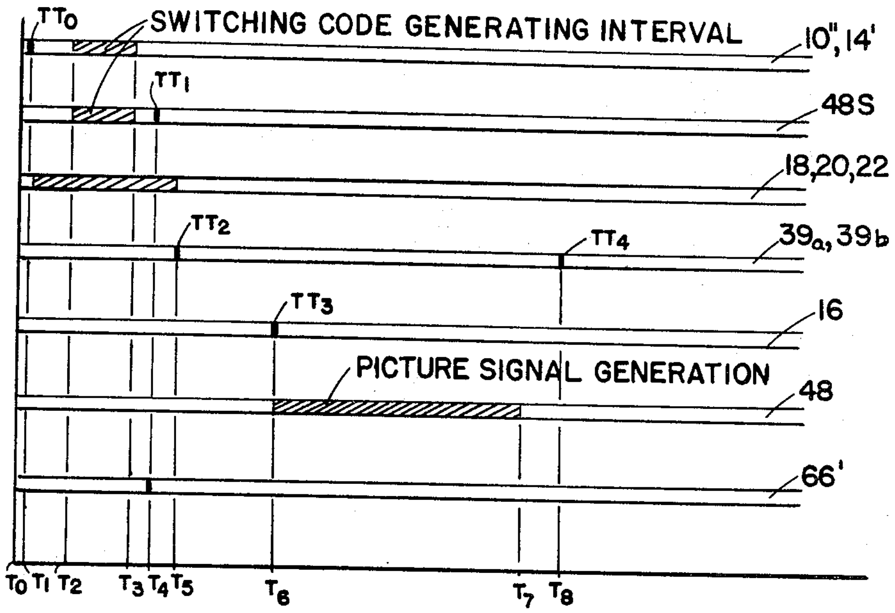
Figure 3:
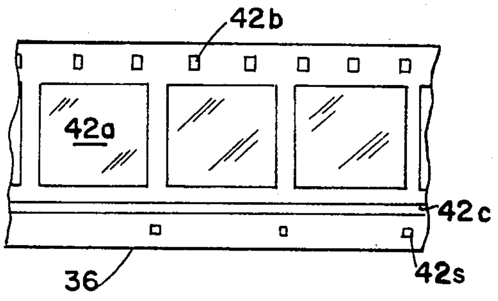
Figure 2:
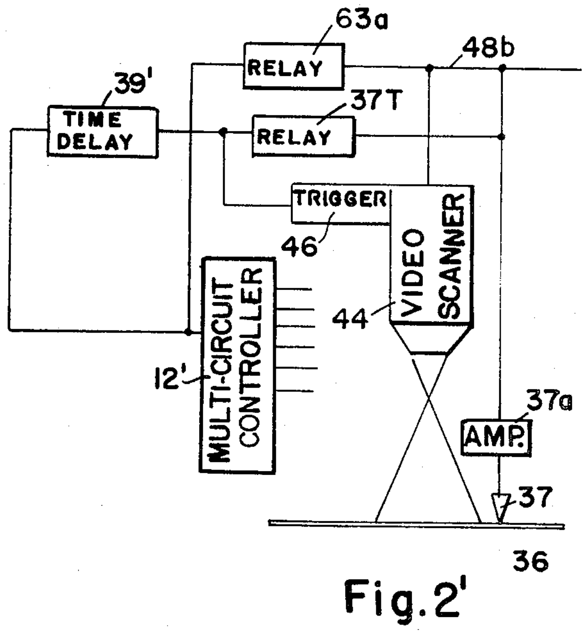
Figure 4:
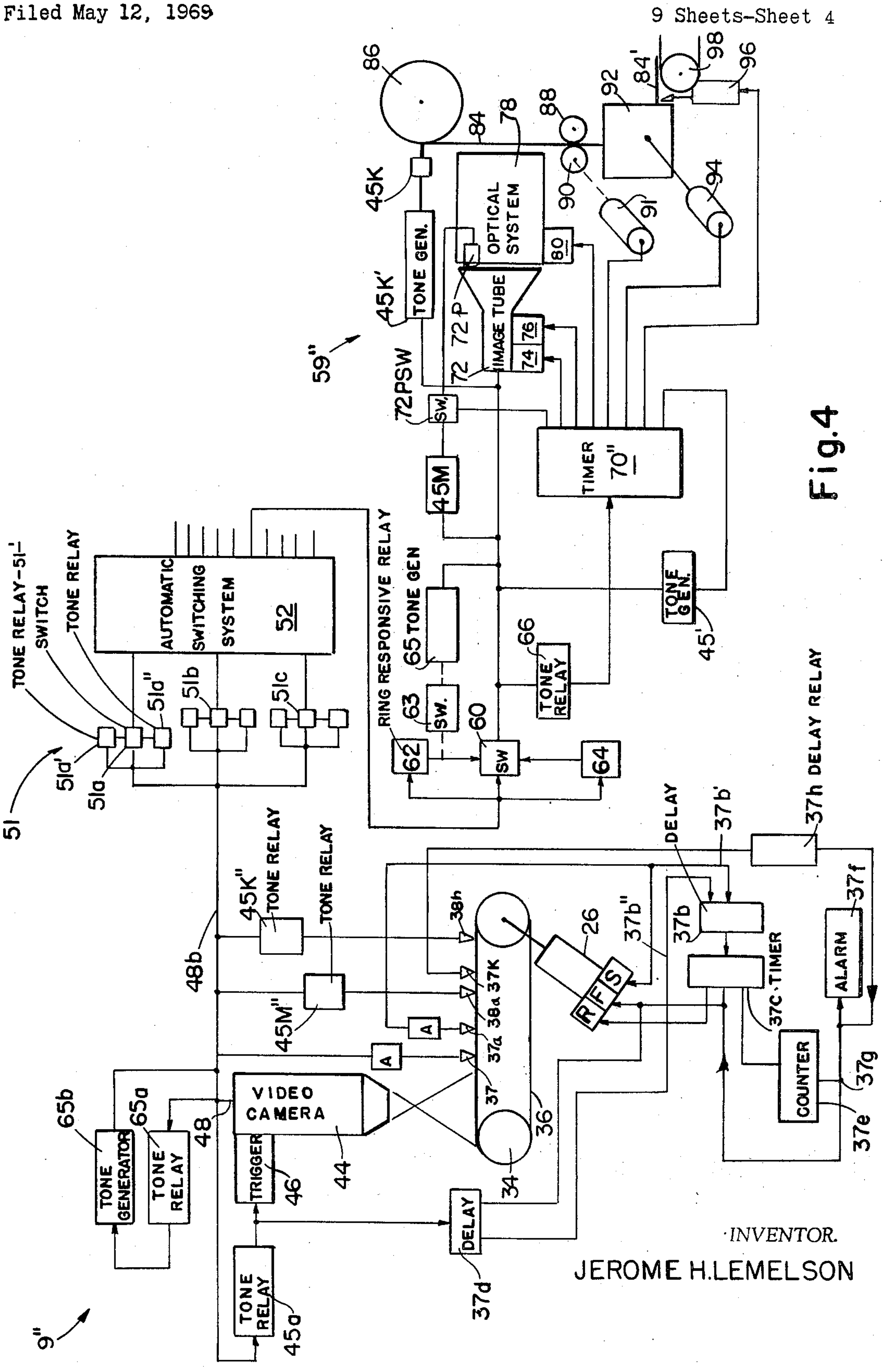
Figure 5:
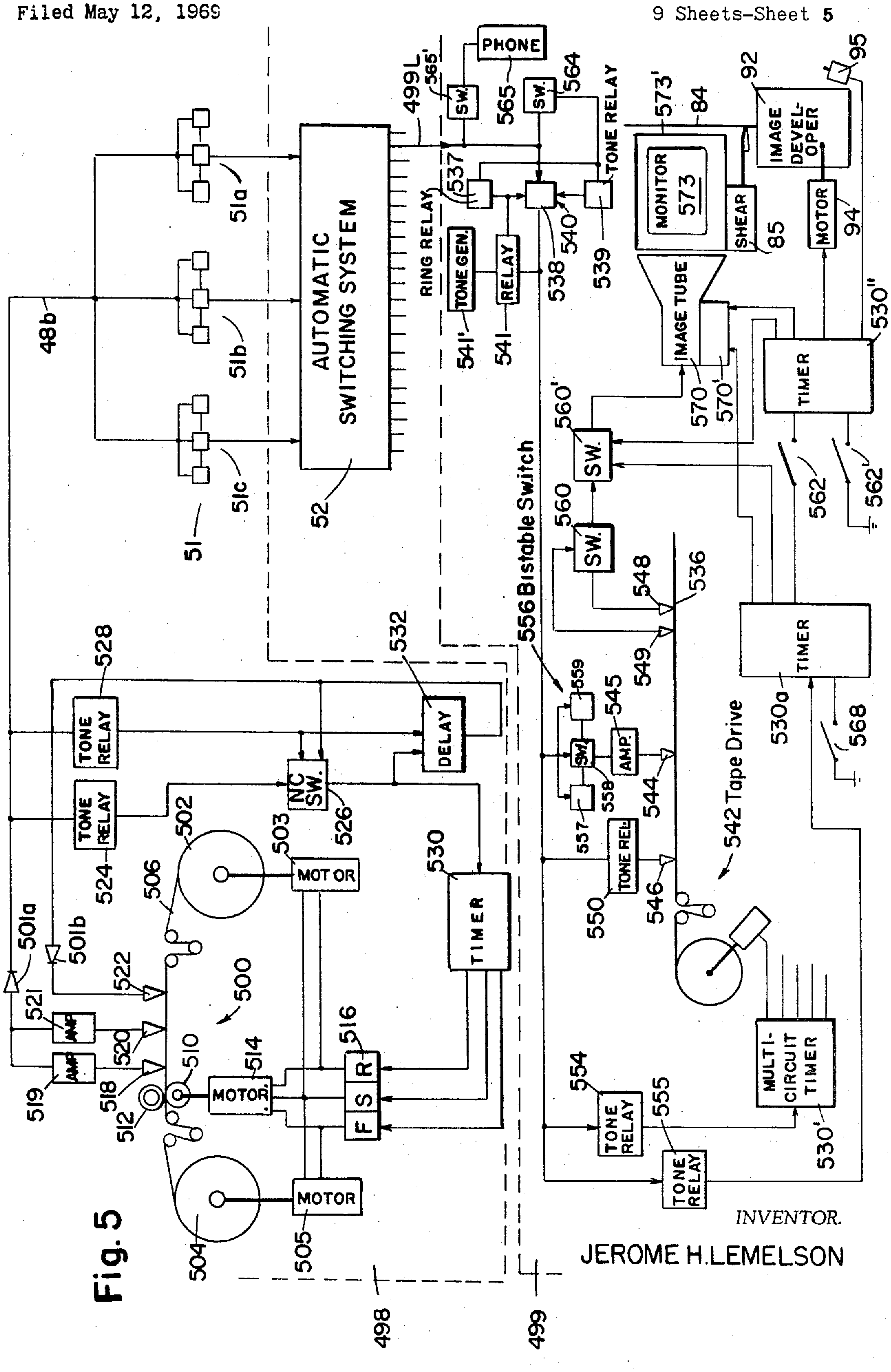
Figure 6:
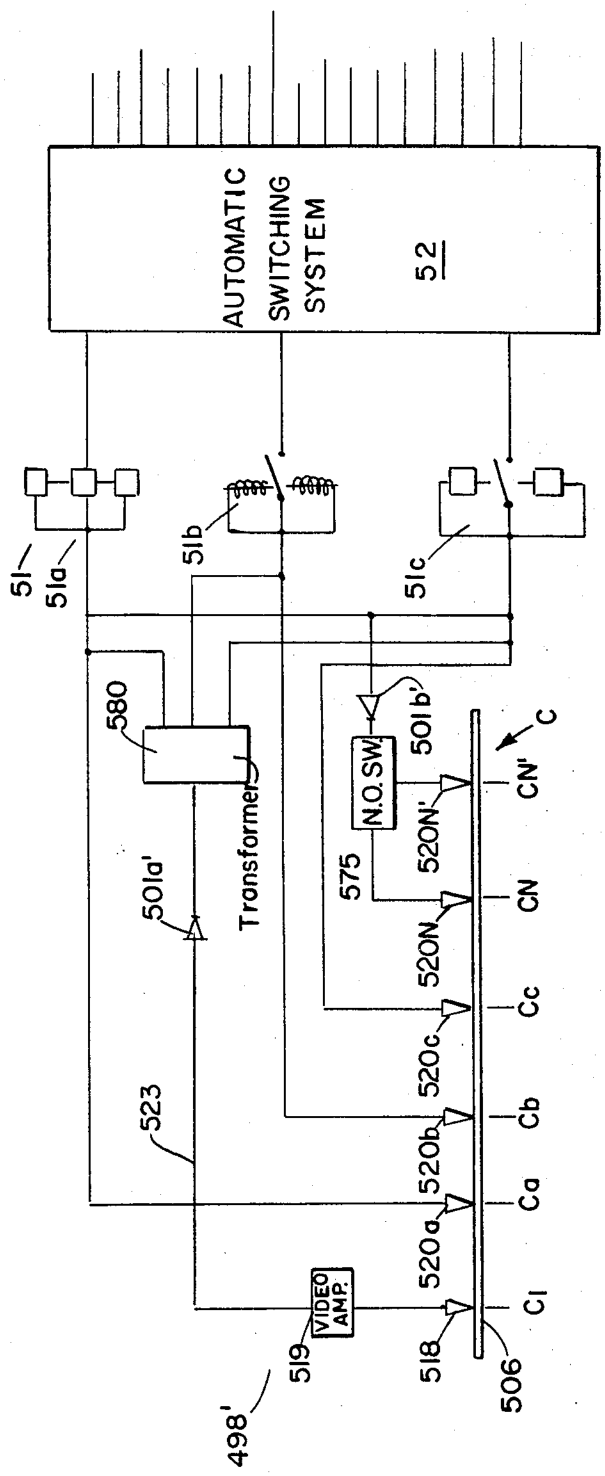
Figure 6:
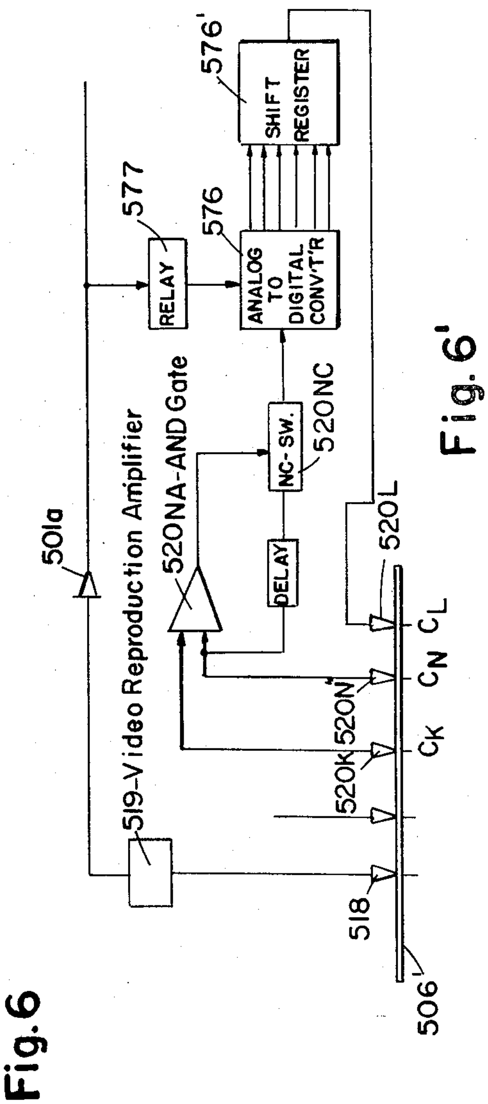
Figures 7, 8:
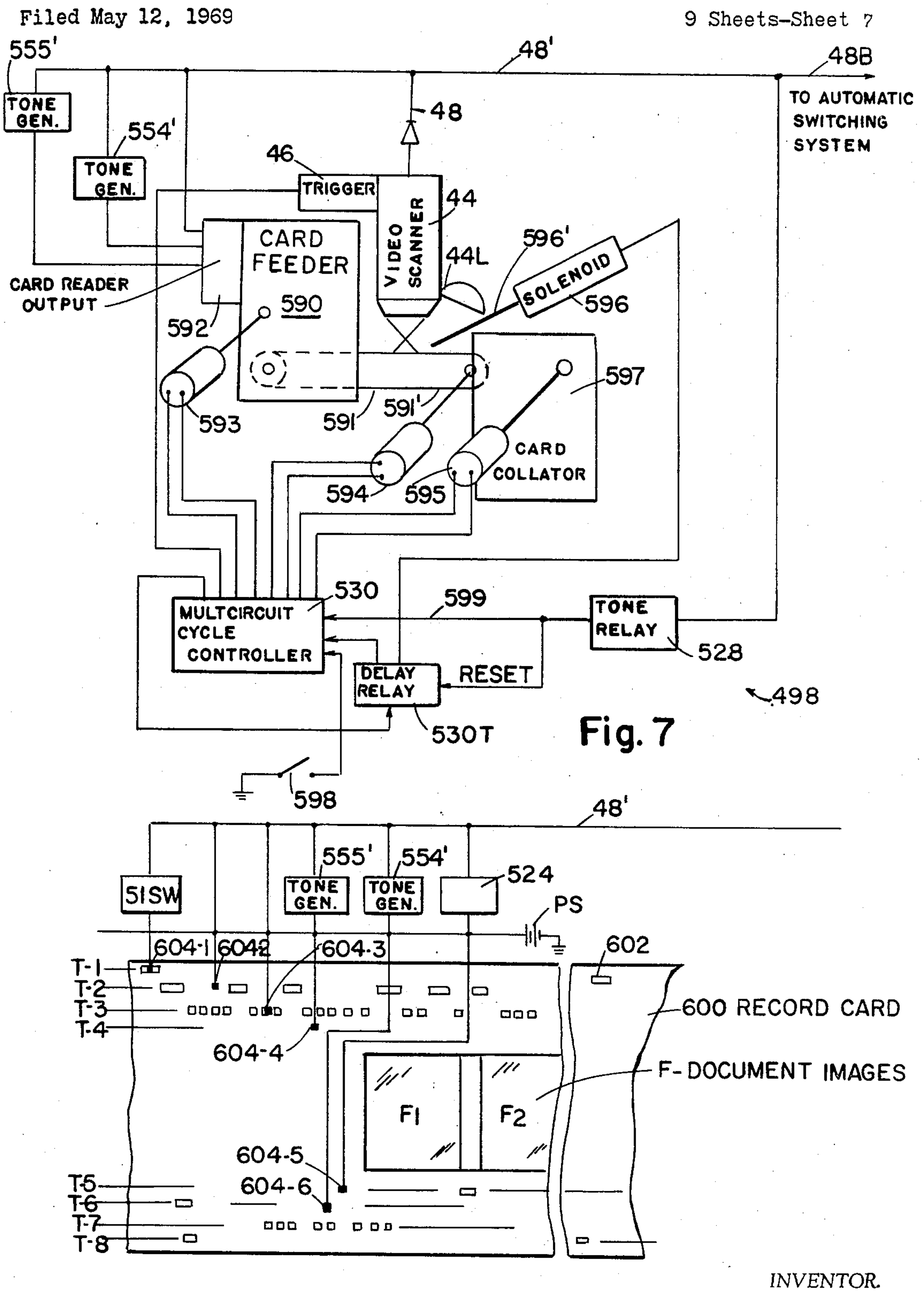
Figure 9:
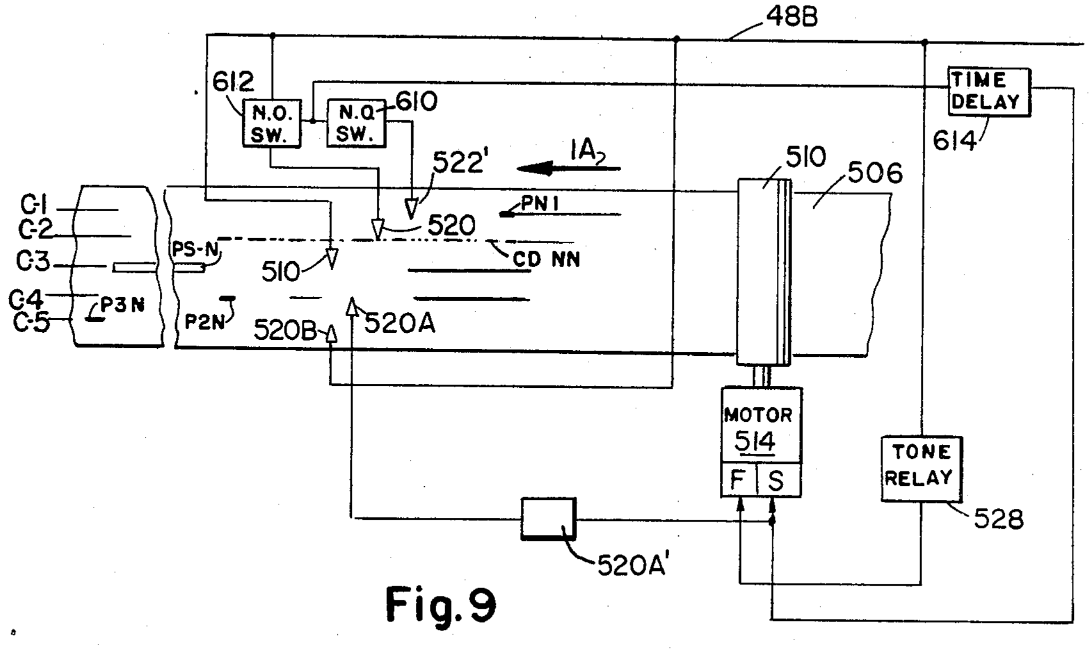
Figure 10:
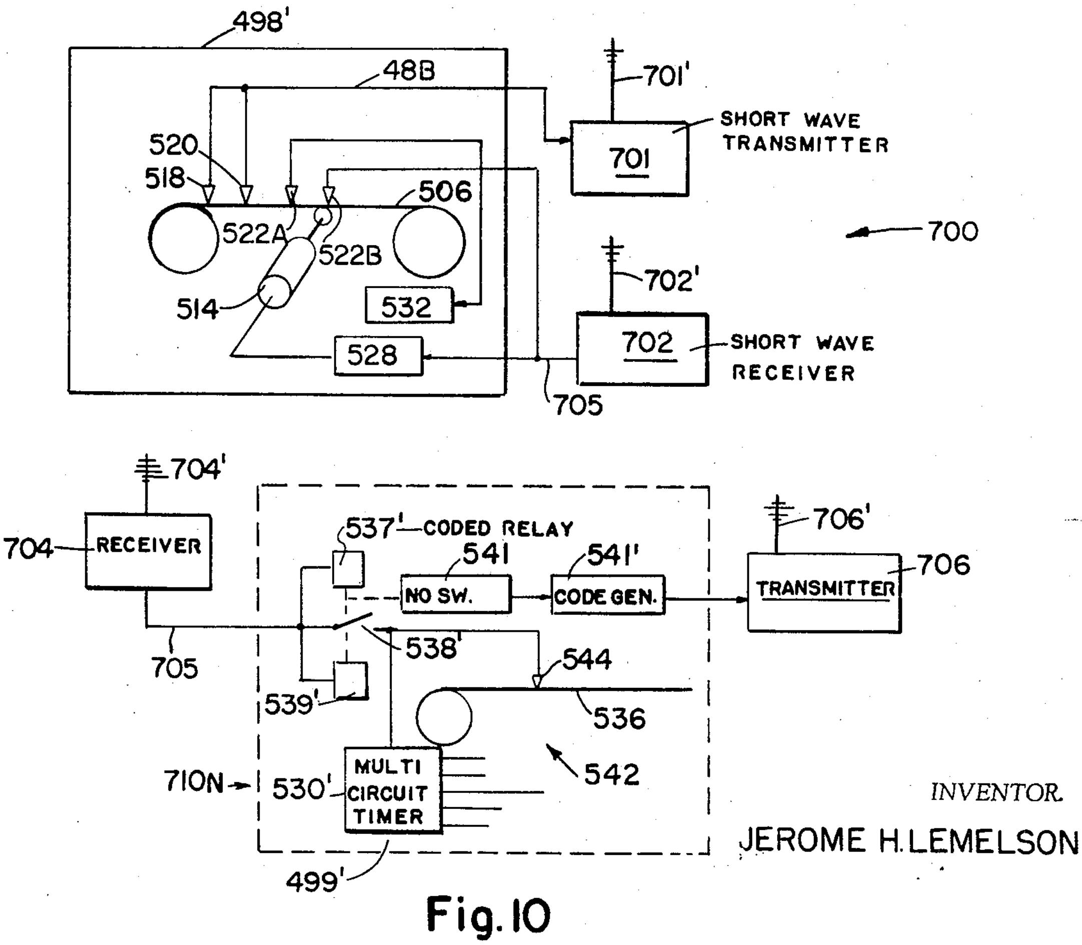
Figure 11:
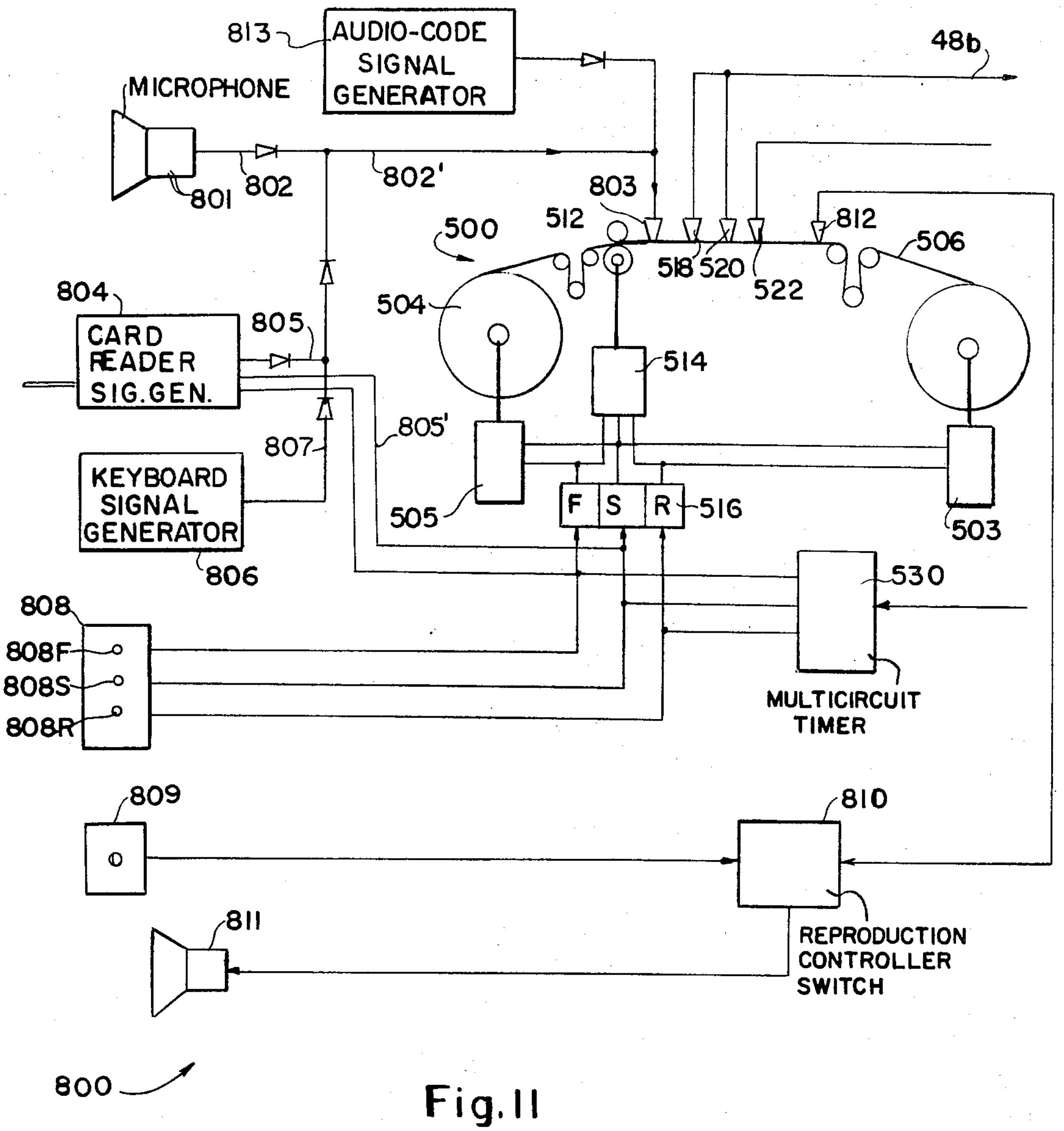

FIG. 2*a* is a timing diagram illustrating the sequence of operation of the devices controlled by control circuitry shown in FIG. 2;

FIG. 2′ illustrates a modified form of the system of FIG. 2 for initiating the transmission of image signals upon completion of the reproduction of switching and connection signals from the recording member thereof;

FIG. 3 shows a fragment of a recording member which may be utilized in the apparatus of FIG. 2 and which contains in addition to a plurality of different picture images, a magnetic recording strip running parallel to said picture strip on which signals may be recorded for controlling the apparatus of the instant invention in selecting one or more circuits over which selected picture signals are to be transmitted, and in addition provides a means for recording any errors or omissions in the transmission of a signal;

FIG. 4 shows a system for the automatic transmission of facsimile signals over telephone circuits with means provided for automatically indicating at the transmitting station when one or more of a plurality of connections have not been made between the output of said transmitting station and one or more circuits defined by the code recorded adjacent a specific image frame;

FIG. 5 is a schematic diagram of an automatic facsimile transmission system employing magnetic recording means at both the sending and receiving stations;

FIG. 6 shows modifications to the system of FIG. 5;

FIG. 6′ shows further improvements in the systems of FIGS. 5 and 6;

FIG. 7 shows the transmitting apparatus of FIGS. 5 and 6 modified to utilize cards and card feeding means for providing switching and picture signal recordings for signal generation as described herein;

FIG. 8 is a plan view of part of a record card which is applicable to the apparatus of FIG. 7;

FIG. 9 shows further details of a magnetic recording tape of the type employed in FIG. 5 with control and transducing means associated therewith for performing recycling functions in accordance with the teachings of the function of the apparatus of FIG. 5;

FIG. 10 is a schematic diagram showing apparatus of the type shown in FIG. 5 modified to use short wave wireless transmission and receiving means to replace the automatic wire switching system of FIG. 5, and FIG. 11 shows modifications to the system of FIG. 5, permitting the automatic transmission and recording of other forms of information.

The systems illustrated in the drawings accompanying this specification are for the most part shown in block diagram notation for the purposes of simplifying the diagrams. Wherever circuit connecting means or lines are shown they generally refer to wire pairs. Wherever control components such as switches, relays, tone generators, timers, sequential switching devices, motors, and the like are shown it is assumed for the purposes of simplicity that the proper power supplies are provided which are connected to power said devices on the correct side of said switches and components. Wherever magnetic recording and reproduction heads are provided it is assumed that the necessary recording or reproduction amplifiers are provided in their input or output circuit to provide the desired signal power or amplitude. All transmitters and receivers are assumed to be provided with the necessary sources of electrical power and other conventional circuit means are utilized to assure proper operation as described.

Where used herein the term "code" refers to a tone signal or bit code signal of particular characteristic.

Throughout the specification and drawings reference is made to control devices such as multi-circuit timers, multi-circuit controllers, and timers which, upon becoming activated, predeterminately control a plurality of electrically operated devices such as motors, tone generators, television camera read-beam controls, image tube erasure control means, relays, other timers and the like. For details of typical multi-circuit timers or repeat cycle controllers which may be applicable where defined in the instant drawings and specification, reference is made to such U.S. patents as 2,536,506, 2,799,811, 2,858,388, 2,905,239, 2,946,-902 and 2,615,306.

Various signal energized tone generators and respective tone responsive relays are also provided as block diagram notations in the accompanying drawings for effecting the control functions described in the specification. These may be made in accordance with the teachings of such U.S. patents as Nos. 2,714,815, 2,757,320, 2,729,771, 2,667,-122, 2,710,953, 2,675,442 and 2,623,964. Reference is also made to the teachings found in such U.S. patents as Nos. 2,835,884, 2,828,480 and 2,811,708 which relate to the selective remote control of various devices by means of selected tone generation at a control station and receipt thereof by respective tone responsive relays.

Figure 1:
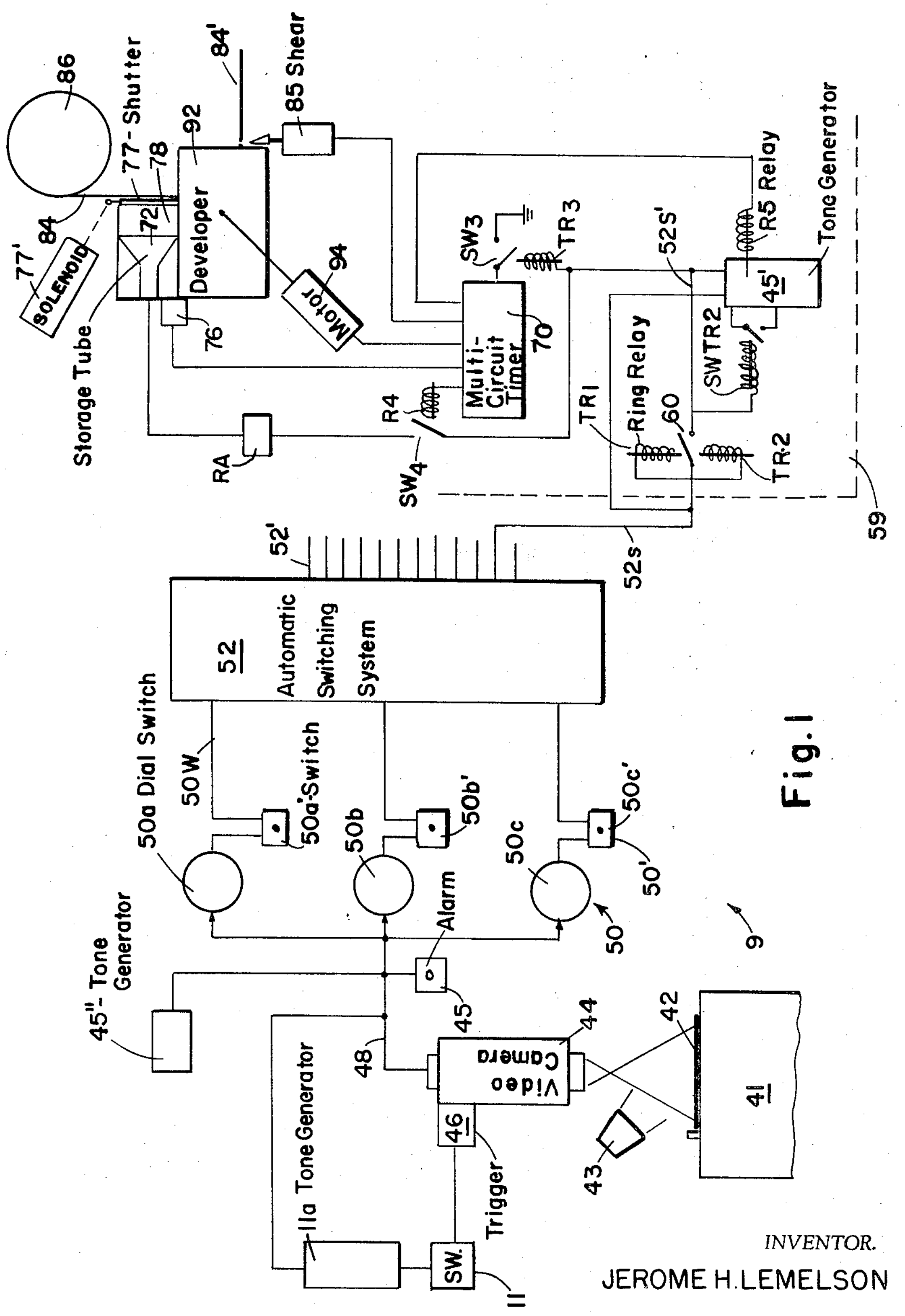
FIG. 1 is a schematic diagram of an automatic facsimile system employing a manual means for connecting the signal output of a video scanning device with one or more facsimile resproduction devices over conventional telephone lines.

FIG. 1 is a schematic diagram which illustrates a facsimile system for the transmission of picture information over conventional telephone lines. The system includes a master transmitting station 9 from which picture signals originate and are transmitted over one or more wire 50-W of a conventional telephone switching system 52 to one or more receiving stations such as the illustrated receiving station 59 by semiautomatic means, without the need for manual attention of the apparatus at the receiving station for the provision of one or a number of prints of the picture information transmitted. A video camera 44 is provided at the transmitter station 9 operable at a slow enough scanning rate to permit the wire transmission of the video picture signal derived from a single full frame sweep on conventional telephone wire lines 50W. As a result, the operator at sending station 9 may transmit picture information to any terminal circuit of the system having one or more telephone line outlets and having suitable receiving and hard copy or picture printing equipment.

The video signal output 48 of the camera 44 is shown connected through multiple switches **50*a*′, 50*b*′, 50*c*′, to telephone switching system 52 which has multiple output circuits 52′ extending to various telephone terminal circuits, one of which inputs 52*s* is shown. Each of the dial operated switches 50, referred to individually by the notations 50*a*, 50*b*, may comprise conventional phone dial line pulsing mechanisms operable for completing a circuit between line 48 extending from the output of 44 and any other phone terminal input in the system. The line 48 is connected via a selected output line such as the illustrated output 50W of switch 50*a* to the central switching system 52 when an associated switch, such as 50*a*′, for example, is manually closed, and as a result, a connection may be made to any other telephone line in the system by dialing or otherwise operating the respective dial switch 50*a* which causes pulse trains to be generated and transmittted to the switching system 52 which effects the necessary switching functions by conventional pulse operated switching and selection means. Thus, if the operator of the apparatus at the transmitting station 9 should decide to send a specific picture to be permanently recorded to one or a number of the receiving stations simultaneously, he merely has to make separate connections between camera output 48 and each of said stations by manually dialing selected switches 50 after closing the corresponding manual switches 50'**.

To operate the apparatus of FIG. 1, a document 42 such as a letter, drawing or other sheet of illustration is placed in a predetermined position relative to the camera 44 on a board or table 41, which position is fixed relative to the camera 44 by means of stops or guides 41' predeterminately located on 41. The notation 43 refers to a light for illuminating the surface of 42.

One or more of the switches 50 are thus dialed, one at a time, to complete circuits between the picture signal output line 48 and one or more of the receiver-printing stations 59. The telephone ring signal generated at each terminal circuit **52*s* energizes a ring responsive relay TR–1 which closes two switches, one 60 a bi-stable switch which completes a circuit 52*s*' of the receiving and recording station 59, and the other, SWTR–2 an override switch adapted to open a predetermined period after being closed which switch energizes a tone or pulse train coded signal generator 45'. The resulting tone or coded signal output of generator 45' is transmitted through switch 60 over the completed telephone circuit 52 to the apparatus at station 9 and energizes a relay 45 responsive thereto which causes a light to flash on or a bell to ring indicating to the operator that the circuit has been completed. Should switch 60 be opened at any time after the circuit has been completed, by accident, means are provided for indicating said condition. The output of signal generator 45' is connected to the input side of switch 60 as illustrated. The moving arm of switch SWTR–2 is linked to the moving arm of 60 such that, if the arm of switch 60 swings to the open position, the arm of switch SWTR–2 will swing back energizing circuit of tone generator 45. The resulting tone signal will be transmitted back through system 52 to energize tone responsive relay 45. If this occurs before video camera 44 has finished its scanning, the facsimile procedure will have to be repeated or stopped. Provided in series circuit with switch SWTR–2 is a slow-to-open relay operated switch TR–2 which maintains tone generator 45' energized to generate a signal for a long enough time after switch SWTR–2 has temporarily closed to energize the indicator 45 at 9**.

The video camera or flying spot scanner 44 is provided with control means for the deflection circuits thereof for causing the scanning beam of camera 44 to automatically effect a complete screen sweep once it is energized to effect the desired recording function at the receiving station. In FIG. 1 for example, a storage tube 72 is utilized to write the picture information on a face thereof and, depending on the characteristics of said storage tube, a signal derived from one or any specified number of screen sweeps of the field 42 by the scanning means of 44 may be required to effect a clear image on the face of said tube. For slow scanning, one sweep will suffice for most purposes. The notation 46 refers to the trigger or switching input between a power supply and the deflection control circuits of camera 44 for causing said camera scanning beam to travel a predetermined scanning path. Switch 46 may be manually actuated per se or actuated by means of a switch 11 which also actuates a tone generator **11*a*. The tone transmitted from tone generator 11*a* is sent over all completed circuits to the respective receiver control means 66 at each of said printing stations which in FIG. 1 comprises a tone operated relay TR–3 which closes a switch SW–3 energizing a multi-circuit cycle timer 70 at each station. The timer 70 is operative to sequentially effect the following actions and to automatically reset thereafter: (a) the erase input 76 to the storage picture tube 72 is energized by a signal passed from timer 70 for a predetermined time interval to erase all picture information or noise from the tube face, (b) a relay R–4 is energized closing normally open switch SW–4 for a period of time necessary to permit the picture signal transmitted from 44 to pass through a recording amplifier RA to the tube 72 and to be written as an image representative of the transmitted information on its face. The notation 78 refers to an optical system for projecting the image generated on the face of tube 72 onto a photosensitive strip of paper or film 84 feeding from a roll 86 which may also ride on the face of 72. The timer 70 thereafter starts a motor 94 after a shutter solenoid 77' has been energized by 70 to effect closure of shutter 77 which was opened by the action of 70 after the writing of the picture on the face of tube 72, thereby blocking light from tube 72 to film 84. Said motor drives the exposed paper through an automatic developing machine 92. When the paper emerges from 92, a cutter or shear 85 is controlled by a signal from timer 70 resulting in cutting off a section of strip 84 to provide a print of a predetermined length. Upon the recycling of timer 70, switch SW–4 opens, and the tone generator 45' may be energized by means of a relay R–5 connected to an output of timer 70 thereby momentarily closing its actuating switch generating a tone on the connected circuit. Thus the indicator means 45 may be activated and used to indicate that the printing apparatus at 59 has operated and completed its cycle and is conditioned whereby either another picture may be transmitted to station 59 or the circuit disconnected. The tone responsive indicator means 45 may contain a counter to indicate that all connected station printers have operated or separate indicators at 45 may be used for each circuit, each responsive to a different tone or code. The tone relays of FIG. 1 may be replaced by coded relays whereupon the tone generators would be replaced by code generators. To disconnect the circuit between the camera output and all of the completed inputs, one or more tone or code generators designated by the general notation 45'' may be provided connected to the terminal circuit of station 9 which, when actuated, are operative to disconnect only certain stations while adding others for further transmission. In such an arrangement multiple tone or code generator forming block 45''** may be operated to generate respective signals to which each circuit-breaking relay TR–1 of the respective receiving stations is responsive.

In FIG. 2 apparatus is provided for automatically transmitting one or more of a plurality of picture signals through an automatic switching and connection system 52 which may be a conventional telephone switching and selection system, from an originating circuit 48 in a sending station 9' to one or more of a plurality of terminal circuits such as 52S which is illustrated as the input of a receiving and recording station 59' which may be one of a plurality of such stations in the automatic system 52. Circuit selection and connection occurs automatically at 9' by generating a plurality of signals, referred to hereafter as groups of selection and control or connection signals, which simulate, by means of tone or code signal responsive relays at stations 9' and 59 and the relays of system 52, the switching action resulting from dialing to obtain selected circuit connections. Each of said signal groups is related to specific document or image information to be transmitted through the system 52, portions of which are signals reproduced prior to and after the generation of respective picture or information signals for effecting the transmission of said signals to selected receiving stations in the system and also for effecting the recording of said signals either magnetically or in visually readable form thereat. A belt, film, or tape 36 is provided on which the images, documents or pictures are placed, mounted, or recorded. Member 36, may also contain recordings of said selection and connection code groups in the form of visual markings, holes or magnetically recorded signals. A transducer 37 such as a magnetic reproduction head or hole actuated switch, if the code is a series of punched holes in tape 36, scans said tape and provides a series of output signals as the latter is moved relative thereto during positioning the next image or page in the scanning field of a video camera 44. Notation 48S refers to the output of an amplifier 37A for code pick-up 37 which amplifier is connectable to the inputs of a plurality of switching units 51 which connect the signal output **48*b* of camera 44 with respective lines 50W extending to the automatic switching system 52 in response to signals generated by pick-up 37**. In the descriptions to follow, discrimination is made between the short digital selection signals for effecting the circuit connections and signals used for control and checking. The latter signals are either specific tones, long pulse signals of predetermined length or codes to which respective relays in the system are responsive. Wherever a tone relay or generator is specified, a corresponding coded relay or binary code signal generator may be employed.

Simulation of the circuit selection and connection function of the conventional phone dial switch which usually is effected by means of multiple stages of selection and connection relays, may be effected by signals transduced from recordings on tape 36 as follows: All selection and connection signals are recorded on one channel of tape 36 and are reproduced in sequence for actuating the relay storage means of the automatic switching system 52. Signals simulating those generated by a conventional dial switch are recorded as codes or tones on tape 36 to which signals a relay 37R is responsive which generates pulse signals on the line connection to automatic switching and connection system 52 to effect a predetermined circuit connection.

The film or tape 36 is moved by means of a tape transport 32 of conventional design from a supply reel 34 to a take-up reel 35. A capstan wheel 38 driven by motor 28 engages the tape 36 against depressor wheel 40 and motors 26 and 30 respectively drive 34 and 35. Control of the starting of the drive means for tape 36 to effect positioning the individual image frames of 36 in the scanning field of camera 44 and the reproduction of the associated selecting and connecting codes as said tape moves, is effected by the action of a multi-circuit self resetting timer 12 used per se to start and stop said drive motors each time it is actuated while stoppage of the tape drive motors is controlled by a switch 40S having an arm riding on the belt or tape 36 which becomes actuated whenever said arm rides into a cutout in said tape which cutout is positioned such that the next image frame is in the scanning field of 44 when switch 40S becomes actuated. The motors 28 and 30 contain respective controls which are both connected to switch 40S and are actuated to stop said motors when the arm of switch 40S rides in said position or frame indicating cutout in tape 36.

The timer 12 is initially actuated by closure of a switch 14 whereafter said timer automatically resets and is operative to recycle in response to a signal from one of several sources. The notation 10 refers to a computer or timer which may energize timer 12 at any predetermined time or in response to the operation of means for moving the image material on tape 36 aligned with the camera 44. The notation 10 may also refer to a tone operative relay which is energized upon receipt of a signal on the connected circuit from a tone generator 45' which is energized at the connected station 59' upon completion of said circuit in a manner to be described. The line output switches 51 each comprise bi-stable switch contacts denoted **515*a*, 515*b*, 515*c* which are closed by the action of a respective tone or code responsive relay denoted 51*a'* and opened by a second tone or code responsive relay 51*a''* each being responsive to a respective signal reproduced from tape 36 or by a signal from computer 10**.

During a cycle of operation, operation of multi-circuit timer 12 effects the starting of motors 28 and 30 which drive tape 36 at constant speed. The first signal reproduced from tape 36 by pick-up 37 is a tone to which one of the relays **51*a'* is responsive which effects the closing of a respective switch 51S. The next reproduced signals are pulses or tones adapted to simulate the signals generated by a conventional dial switch which signals pass to switching system 52 over the connected circuit 50W and connect the output 48 of camera 44 with a selected terminal circuit when the input switch 60– to the respective station 59' is closed. The switch 60– has a closing relay 62 responsive to the ring signal generated on the input line 52S for disconnecting said circuit at the end of transmission of an information signal when the respective switch 51 opens. If multiple circuits are selected for connection to the output of 44, the codes or tones are positioned sufficiently apart on tape 36 to permit each connection to be made and lock in before the next selection code group is reproduced. A switch 40S may be actuated at the end of the reproduction of each selection code or when each image is in the scanning field of 44 to energize the stop controls of motors 28 and 30 and a time delay relay 39 which is operative to reactivate timer 12 after scanning has been effected and the picture signals transmitted over the connected circuit. The next signals reproduced from tape 36 by pick-up 37 may be tone signals to which selected or all of the relays of switches 51 are responsive for disconnecting the circuits to switching system 52**.

Energizing of the beam deflection control 46 of camera 44 may be effected by means of a signal from the multi-circuit timer 12 at a time after tape 36 has been stopped and all circuit connections have been made. Shown also in FIG. 2 is a feedback signal generating means for triggering the defection chains of camera 44 by providing a signal at the control 46 generated at the terminal circuit 48T. After switch 60– has been closed effecting a circuit connection between stations 59' and 9' and after all selected circuits have been completed, a control tone signal is reproduced from tape 36 by pick-up 37 and transmitted over all connections. A tone operative relay 66 responsive to said tone in each terminal circuit 48T becomes energized and actuates a multi-circuit timer 70' of the self resetting type which timer first energizes a tone generator 45' which transmits a tone back to the sending station 9' over the connected line at which it energizes a tone relay **45*a* responsive thereto. If a single transmission circuit is completed, tone responsive relay 45*a* may then energize control 46 which controls and effects at least a single screen sweep of the beam of camera 44 whereupon the picture signal together with the necessary sync or composite video signal is transmitted over said circuit and recorded at the connected station as follows. Timer controller 70' conditions a video slow scan storage tube 72 for writing by actuating the automatic erasure input 74 thereto, whereafter relay 45*a* becomes energized. The resulting video signal records video on the face of 72 which may be reproduced shortly thereafter by the means described for FIG. 1. The severed print 84' drops onto a conveyor belt 98 which is driven by a motor 96 started by timer 70'. The device 98 may also comprise an automatic stacking or collating mechanism and the motor 96 driving said device may be controlled by a stepping motor or tone operated relay responding to signals transmitted from 9' and reproduced from the tape 36 by pick-up 37. The shutter 80 is solenoid controlled and is actuated at the proper time for exposing the 84 for a predetermined time by the action of timer 70'. Similarly, motors 91 and 94 drive said reproduction paper 84 in response to the operation of 70'. The motor 91 drives a capstan wheel 90 engaging the paper from supply roll 86 against a depressor wheel or drum 88 and the paper 84 is fed into an automatic developing and cutting device 92 such as the Lithoflo Processor produced by the Haloid Company, of Rochester, N.Y. The shear cutting means of FIG. 1 may also be employed to cut the print automatically in response to the action of the timer 70'. The Haloid Copyflo 24 may also be employed for apparatus 92 of the RCA Bizmac Electrofax unit with the face of the image tube optical system 78** adjusted for providing the desired image at the proper plane of either of these devices.

The means provided in FIG. 2 for controlling the scanning action of the camera 44 comprises a signal from either timer 12 at the proper time in the cycle or a feedback signal generated after the connection is made. This limits the operation of the apparatus to a single or a predetermined number of connections since the signal provided on line 16 by timer 12 will occur at the same time after timer 12 becomes actuated unless it is readjusted. The time at which tone generator 45' becomes operative to generate a signal which energizes tone relay 45*a* is also fixed. To reduce operating cycle time, means are provided in FIG. 2' for initiating the scanning action and generation of the desired picture signal as soon as all circuit selection and connection signals have been reproduced from tape 36. Recorded on tape 36 at the end of all selection signals associated with particular image information to be scanned, is a particular tone signal reproduced by the pick-up 37. This tone or code is passed to a relay 37T which is responsive only thereto and which, upon becoming energized by said signal, energizes the scanning controller 46 for the read beam of the scanning tube of the camera 44. Thus 46 is only energized in response to a signal reproduced from tape 36. In order to assure that the reproduced signals pertaining to one circuit will not interfere with the switching action of the prior reproduced code, means are provided in FIG. 2' for intermittently driving the tape 36 so that it moves only during the reproduction of a single code group therefrom for effecting a single circuit connection with predetermined of the circuits 50W. It is assumed that the components of FIG. 2' are applicable to the circuitry of FIG. 2 with the following modifications. The circuit 16, relay 45*a*, and 45' and 23' are not present. A tone generator 65, shown in FIG. 2 is provided in the terminal circuits 48T of each receiving station 59'– which is adapted to automatically become energized for a short time as soon as the relay 62 closes contacts 60'. If the ring or tone operated relay 62 includes a solenoid for closing said contacts, 60' may also be used to actuate a normally-open, slow-to-open-after-closing switch 63 of the over-ride actuator type which gates a power supply or otherwise energizes a tone or code generator 65 which transmits a signal over the common line connection back to the sending station 9'. The signal from generator 65 energizes a relay 63*a* at station 9' which is responsive only thereto which relay energizes a sequential controller 12' replacing timer 12 of FIG. 2. The tape 36 is driven forward thereafter since the drive motors of the transport 32 are now controlled by 12' and are stopped thereby after a predetermined degree of movement after the entire part of the selection code for the next circuit connection has been reproduced by 37. The feedback signal from generator 65 of the next connected circuit, again energizes the reset multi-circuit timer 12' and the cycle is repeated until all connections have been made. The final actuation of switch 40S occurs when the document, page or image to be scanned by camera 44 is in the scanning field of said camera so that it will be stopped therein. Just before the switch 40S becomes actuated, a tone or code is reproduced by pick-up 37 from tape 36 to which a relay 37T in the output of 37 is responsive. The energizing of 37T by said final signal provides a signal for triggering the deflection chain control 46 of camera 44 and video scanning of the picture centered in the scanning field occurs. The signal output of 37T is also used to energize a time delay relay 39' which provides an actuating signal for recycling 12'. If all new circuits are to be connected, a single code or tone signal may be reproduced during the next movement of tape 36 to disconnect selected of the circuits 50W– by actuating selected of the relays 51''–. The relay 37T is preferably slow acting so that its output which energizes 46 is provided only after the belt 36 has come to rest.

In FIG. 2*a* is shown a timing diagram illustrating operation of the automatic control means of FIG. 2 operative to effect the reproduction of selected switching and connection signals from the recording member 36 and the associated picture information recorded thereon for transmission to the selected receiving station 59'. Cycle time from zero time $T_0$ increases along the ordinate of the graph while the different control circuits are illustrated as bars extending parallel to the ordinate axis. At time $T_1$ a pulse is generated on the output 10'' of the computer 10 or the output 14' of manually operated switch 14 and is utilized to initiate cyclic operation of the programmer or multi-circuit timer 12. Output circuits 18, 20, and 22 of the timer become energized thereafter and properly operate motors 26, 28 and 30 which drive the recording belt or tape 36 past reproduction transducer 37. At time $T_2$ reproduction transducer 37 starts reproducing the switching and connection code from the member 36 moving therepast and said code appears on the output 48S of the reproduction amplifier 37A for transmission to the automatic switching and connection system 52. Said code is generated until time $T_3$. At time $T_4$ which occurs sufficiently after $T_3$ to permit the switching system 52 to effect a connection with the selected receiving station, tone signal $TT_1$ is reproduced from member 36 and transmitted on output 48S through the connected circuit to the receiving station 59' for energizing tone responsive relay 66 which initiates the operation of the timer 70' at the receiving station. At time T5 signal TT2 is generated by switch 40S and is applied to circuit 39*a* for energizing time delay relay 39 and simultaneously activating the stop controls for motors 26, 28 and 30. At time T6, a sufficient interval after time T5 to permit the conditioning of the recording apparatus at the receiving station to receive the picture signal, a pulse TT3 is generated on the output 16 of timer 12 and is transmitted to the trigger control input 46 to the video camera 44 which initiates scanning of the image frame which has been placed in the scanning field of the camera by the controlled operation of the tape transport motors. The picture signal generated by camera 44 is transmitted on output 48 thereof over the connected circuit to the storage tube 72 at the receiving station during the interval T6–T7 and at time T8, the output 39*b* of time delay relay 39 becomes energized with the signal TT4 which is transmitted to reactivate multi-circuit controller 12 which is operative to repeat the described operations of effecting the positionng of the next image frame on member 36 in the scanning field of camera 44 and if a code is recorded along track 42*c* of number 36, to effect the connection of a new circuit between sending station 9 and another selected receiving station as described.

FIG. 3 is a fragmentary view of one design of the belt or tape 36. The individual picture frames 42*a* may be developed in the base sheet or belt 36 if the latter is photographic film or photosensitive paper and are shown spaced equidistant apart although their spacings may be a function of the selection and connection coding provided on 36. The frames 42*a* may also be individual pictures, typed or written sheets, letters or the like merely placed on the horizontal belt 36 or held thereon by cement or friction fastening means such as clips secured to the belt. Adjacent the image frame containing center portion of belt 36 is a band 42C of magnetic recording material such as magnetic oxide bonded to the belt base 42. Cutouts 42S are provided adjacent 42S for actuation of switch 41 although the same function may be provided by a signal recorded on an adjacent track of 42C. The signals recorded on 42C and the frames or sheets 42*a* bear a positional relationship to each other and the cutouts 42S utilized for synchronization purposes and the selection of the required circuits for related frames.

FIG. 4 shows a facsimile system adapted for transmitting picture information as picture signals reproducible as different still images or pictures at one or a plurality of receiving and printing stations and effecting switching connection and transmission automatically without the attention of an operator. An automatic switching system 52 such as an automatic telephone, digitally operated circuit selection and connection system, is employed. The receiving and printing stations, one of which 59″ is illustrated, may terminate different telephone extension lines as part of a company phone system or may comprise telephone line connections at different locations in the same or different cities. A preferred application of the system of FIG. 4 is for effecting automatic transmission of business forms, letters, pamphlets, graphs, and the like between different business or government organizations during the hours of low line load such as at night, thereby eliminating the need for transmitting such forms by mail or messenger service.

The apparatus of FIG. 4 includes a video scanner or camera 44 adapted for slow scanning one at a time of a plurality of pictures or image frames provided on an elongated conveyor belt, tape or film 36 shown for closed loop drive although it may comprise reel-to-reel driven tape. An intermittent card or page feed of said frames may also be employed in place of 36. The tape 36 is intermittently driven and stopped so that each frame thereof is centered connected to the scanning field of the camera 44. Control of said intermittent drive may be effected by switching control signals recorded on the side band area 42*c* of said tape as shown in FIG. 3, which may also effect and control the switching necessary to connect the output of said camera with a selected receiver-printing station in the system 52 in coaction with feedback signals derived from the selected station when connection is made therewith. Assuming that the tape 36 is in motion, a position indicating signal or pulse is recorded along the magnetic recording area 42*c* of the tape in a position such that it may be used to indicate that the next picture frame is about to become centered in the scanning field of 44 when reproduced from 36. Said pulse is reproduced by magnetic pick-up head 37*a* riding on said tape and is transmitted to energize the stop control S of motor 26 driving said tape whereupon the motor stops when the next frame to be transmitted is centered for scanning. During the same sweep of the tape, another pick-up head 37 riding on another channel of the magnetic portion of belt 36 reproduces a digital code therefrom to effect a line connection between the output 48 of camera 44 and the remote station 59″.

The signals for single station connection, include a tone signal recorded on 42*c* and adapted to be reproduced by pick-up 37 and to close a tone responsive relay 51′– of one of the switches 51 thereby connecting camera output 48 with the telephone switching system 52. The recorded control signals include a series of pulse or tone signals next reproduced by 37 which simulate the pulses produced in manually dialing a number. Said signals are adapted to connect the output of camera 44 with one of the many circuits in the switching system 52. As it is possible that the selected circuit connection may not be completed by the time the tape 36 has come to rest, means are provided to automatically recycle said tape if said connection has not been made. The ring signal generated on the input to the station 58″ causes a flip-flop input switch 60 to close by energizing the coil 62. The solenoid actuating 60 to close when a ring-responsive relay 62 is energized, is also adapted to momentarily close a monostable, normally open switch 63 which gates a power supply to a tone generator 65 thereby generating a tone on the completed circuit which is transmitted back to the sending station and may be used for indicating said connection. The tone signal energizes a relay 65*a* at the transmitting station which actuates a second tone generator 65*b* which transmits a tone back to the receiving station 59″. The tone received at 59″ energizes the relay 66, responsive thereto, which actuates an automatic multicircuit timer 70″ which effects the described actions which condition the storage tube 72 for writing and control the printing equipment for conveying an unexposed frame of film or paper into the image field of tube 72 or optical system 78. The timer 70″, when operating, energizes another tone generator 45′ which sends a tone signal back to the transmitting station and energizes a tone relay 45*a*. Said relay 45*a* pulses or energizes the scanning controller of camera 44 which effects a video frame scanning action. The signal from 45*a* is also transmitted over another circuit and energizes a time delay relay 37*d* which is adapted to perform two functions. Relay 37*d* sends a signal to actuate the start control F for the motor 26 a sufficient delay period after scanning starts to permit a complete scan of the image field of the camera 44. The first signal reproduced by pick-up 37, after tape 36 starts, is a tone signal which is adapted to open all of the closed switches in the bank of output switches 51 which are sufficiently slow-to-open to permit said tone signal to also be passed to the circuit-opening tone responsive relays 64 at all printing stations connected to transmitting station 9″ thereby opening the flip-flop input switches 60 of each station. The described cycle repeats when the next code signals are reproduced by pick-up 37 to effect connections as described. If it is desired to retain the circuit with station 59″, the signal which activates switches 51 and 60 are not recorded on the next length of tape which contains only the tape drive stop-signal. If it is desired to transmit the next picture or image to other stations not connected during the prior cycle, the new picture signal and pulse train necessary for effecting said connection may be recorded on the next length of the area 42*c* scanned by pick-up head 37.

A means for automatically indicating when a connection has not been made and recycling the functions necessary to reattempt effect a circuit selection is provided in FIG. 4. The tape position indicating stop-pulse reproduced by 37*a* is also transmitted to a time delay relay 37*b* on circuit 37*b*′ which actuates relay 37*b*. The time delay relay 37*b* is adapted to transmit a pulse over an output at a predetermined time after recipt of said stop-pulse provided that a second input thereto is not energized, which resets and deactivates said relay until circuit 37*b*′ is next energized. The reset input circuit 37*b*′ to 37*b* extends from time delay relay 37*d* which is energised by the tone signal generated by 45*a*. Thus, if there is no signal generated by 45*a* which indicates that controller 70″ at the receiving station 59″ is activated, 37*b* will provide an output signal which may be used to deactivate the apparatus, activate an alarm, or merely recycle the tape 36 so that the same signals may be generated and may be used in another attempt to establish connection with 59″. The output of 37*b* is shown connected to the energizing input of a multi-circuit timer 37*c* of the self resetting type which becomes deactivated after effecting a complete control cycle. The timer or controller 37*c* is adapted to control the motor 26 by energizing and de-energizing its reverse and forward controls R and F at time intervals to effect movement of tape 36 at least a distance equivalent to one frame and drive it forward again, thereby repeating the aforedescribed reproduction of connection signals to effect said circuit connections and preposition the same image frame in the scanning field of 44. One of the other circuits controlled by timer 37*c* includes a counter 37*e* which counts the times 37*c* becomes energized and is adapted to activate an alarm 37*f* after a predetermined number of recycling actions indicating that the connection has not been made after a predetermined number of attempts to make said connection. The output of counter 37e may also be connected to the forward drive control F of motor 26 which is operable thereby after a predetermined number of circuit connector attempts to step the conveyor to the next frame. Said output circuit 37g of counter 37e is also shown connected to a recording head 37k operatively coupled to a third channel of the magnetic track 42a of the tape for recording a signal on the proper length of the tape to indicate which picture signal was not transmitted due to failure to make the circuit connection. Later when the tape is rewound or examined, the signal recorded by 37k may be used to recycle the particular frame or to indicate to a person or computer checking said recording channel which connections have not been made and which picture information still requires transmission. The notation 37h refers to a time delay relay in the circuit 37g adapted to provide said recording on 36 while the tape is in motion at a time after 36 has been moved forward to energize the forward to energize the forward control F of 26.

The notation 64 refers to a tone responsive or coded relay adapted when energized to operate a solenoid or otherwise actuate switch 60 to open. If relays 64 of each station are responsive to different tones or codes, certain of said connections may be disconnected by signals reproduced from 36 while others are maintained for the continued transmission of information thereto.

Means are also provided in FIG. 4 for indicating at the transmitting station if all or parts of the picture signal was not received or recorded by one of the receiving stations even though the connection is made. The notation 45K refers to a limit switch or other means which becomes actuated when the tape or photosensitive paper 84 approaches or reaches the end of the web provided on the supply reel 86. Actuation of 86 may be used to sound an alarm or energize other indicating means at the receiving station. In FIG. 4, the actuation of 45K when it rides in a position indication slot in tape 84, energizes a tone generator 45K' which transmits a pulse code to tone back to the sending station which energizes a tone or code responsive relay 45K'' which may shut down the apparatus thereat, actuate a buzzer or light, or energize a recording head 38a riding on the magnetic portion of 36 but on a different channel than the other heads. The position of the signal recorded by recording head 38a is an indication of which picture signal was not recorded by all receiving stations. If 45K' is adapted to emit when actuated a tone or pulse code followed by a second pulse code or tone indicative of the particular receiving station, and the relay 45K'' is a normally open switch which is closable by said first tone and is slow-to-open and adapted to pass said second pulse code or tone on the connected circuit to be recorded by means of head 38a, said recording will be indicative of which of the receiving stations did not provide a recording media and may be used for automatically indicating such a condition to the subscriber of the receiving station. The relay 45K may also be provided to become operative with the failure of other components in the receiving station apparatus such as the tube 72, motors, controls, etc.

The notation 72P refers to a photoelectric device such as a photomultiplier tube and relay positioned to scan a specific spot or area of the face of tube 72 and adapted to provide an output signal when said scanned spot is at a particular brightness or light emissivity. The output of 72P is connected through a normally open switch 72PSW to the energizing input of a tone or coded signal generator 45M which, when energized by 72P, transmits a tone or code back through the connected ciircuit to the transmitting station 9'' to which a tone or coded relay 45M'' is responsive. Said relay 45M'' is adapted to produce an output when energized by signal from 45M which is recorded on a separate channel of the magnetic area of recording member 36 through recording head 38b. The scanner or photoelectric cell 72P may be used to indicate if a condition such as a picture exists or doesn't exist on the writing face of video tube 72, and may be used to effect the immediate recycling of the transmission of the picture signal transmission or to effect a recording as described which may be later reproduced to effect said retransmission or indicate which picture signal was not received and written onto the face of 72. The image field scanned by the beam of camera 44 may contain a patch of a particular color brightness or black area in the same relative position as 72P so that if this color, brightness, or black area is not opposite 72P the latter may indicate the condition by means of an output signal after the deflection chain of 72 has been triggered. If 45M is a code producing switching ciricuit having a first part adapted to close a normally open switch and a second part adapted to pass through said switch and be recorded on the magnetic part of 36 the code may be such that it is indicative of which of the stations connected to the output of transmitting station 9'' did no have its picture tube 72 in operative condition or did not receive said picture signal. So as not to produce an output at all times, the normally open switch 72PSW is closed by means of the timer 70'' or by means of a code transmitted from transmitting section 9'' and reproduced from the magnetic portion of 36. If 78 is a dual image optical system and scanner 72P is a camera or cathode ray read tube with associated deflection circuits triggered by means of a signal from timer 70'' after the receipt of the picture signal and its conversion to an image on the face of 72, said scanner 72P may be used to generate a picture signal similar to the one modulating 72 which may be sent back to 9'' and recorded on 36.

The picture signal recorded on 36 may be kept as a record of the information transmitted and recorded at 59'' or may be automaticaly scanned and compared with the transmitted signal by also recording said transmitted signal on another channel of 36 as it is generated. If scanner 72P is a camera scanning tube or flying spot scanner, it may also be positioned above the developed portion of the photosensitive strip 84 such as above or adjacent the cutoff page 84' so that it will scan and provide a picture signal of what actually was printed or developed on the recording medium 84. In this arrangement, the scanning by said camera tube 72P is initiated by the multi-circuit timer 70'' at a time after the picture becomes developed and the disconnection of station 59'' from 9'' is not effected until the latter's receipt of the picture signal resulting from the scanning of the printed image. 72P may also comprise a plurality of small photomultiplier tubes placed at different positions relative to the writing face of 72 with each adapted to transmit a signal back to 9'' at different times during the scanning of the beam of 72 to indicate the continued receipt of the picture signal thereat.

FIG. 5 is a block diagram showing a facsimile system of the type described employing video magnetic recording and reproduction means at the transmitting station. The camera of FIGS. 1 to 4 is not provided in FIG. 5 to generate the slow scan picture signals which are transmitted over the automatic switching system lines to the selected receiving station or stations. In its place is provided a magnetic recording tape 506 having recorded thereon, in addition to the circuit selection and control signals as described, a plurality of video picture signals each derived from camera scanning a still picture and arranged in tandem array. Each picture signal is provided with a respective group of selection and control signals adapted to be reproduced from the tape just prior to the reproduction of the respective picture signal. The picture sginals preferably contain the horizontal and vertical synchronization signals combined therewith so that the beam of the video receiver at the receiving stations will be driven in synchronization with the picture generating portion of the transmitted signal. Since slow scanning is employed, it may only be necessary to record the frame vertical sync signal with or in advance of each picture signal either as a tone signal or conventional sync signal (to be clipped therefrom at the receiver), the rest of the scanning action occuring at each receiver and controlled by automatic synchronizing means thereat.

In FIG. 5, a tape transport 500 is provided comprising a supply reel 502 driven by motor 503 and take-up reel 504 driven by motor 505 for feeding a multi-channel tape 506 in motion relative to a plurality of magnetic heads. A plurality of idler pulleys 508 are provided for guiding the magnetic tape 506 which is driven by means of a constant speed motor 514 driving a capstan 510 against the tape. A depressor roller 412 serves to engage the tape frictionally against 510. The numeral 516 refers to a controller for controlling all three drive motors, which controller has three inputs F, S and R which when energized respectively control the tape drive servo to move the tape forward at constant speed, stop it, or reverse the drive thereof at a higher speed than said forward speed and preferably two or three times faster.

For many applications where picture information is to be transmitted to local receivers as compared to long distance circuit connection, the time to make the connection will usually be known, and, if the line is clear, will, for all practical purposes, take less than 10 seconds per connection. The tape 506 may therefore be driven continuously unless stopped as previously described to reverse and repeat the signal. Means are also provided in FIG. 5 for intermittently driving the tape, i.e., momentarily stopping it until a selected circuit connection has been made. For continuous operation of the tape, all recorded picture and selection signals are spaced sufficiently far apart on the tape to permit enough time between the reproduction of a selection signal digital code to permit the prior connection to be made so that the following selection code signal will not disrupt or alter the selection switching action of the prior signal. A single reproduction head 520 is provided for reproducing all selection code signals and tone signals from a single track of 506 although, it is noted that multiple reproduction heads may be provided, each riding on a different track and each being connected to a respective input circuit to the automatic switching system 52 as shown in FIG. 6 thereby eliminating the need to pause between selection signal recordings to permit all selected circuits to which a particular picture signal is to be transmitted to be completed simultaneously. After the final selection code has been reproduced from tape 506 by head 520 and sufficient time has elapsed for the circuit connection to be made, the slow scan picture signal associated therewith is reproduced by the magnetic reproduction head 518. The resulting transduced signal is amplified in a reproduction amplifier 519 and is transmitted over all completed circuits to the receiving and recording transducers of the selected stations 550 on lines 552. Another means for indicating if a selected connection has not been made is illustrated in FIG. 5 involving automatic control of the recycling of the tape whereby all selection tone and digital signals will be reproduced again.

Recorded on the channel of tape 506 from which head 520 reproduces, is a tone signal which follows the digital selection signal which tone signal is of a different frequency than the tone preceding said code which energized a particular output switch 51– to close. This second tone signal is recorded in a position such that it will be reproduced some time after a tone signal of longer duration is produced at the selected receiving station if the connection selected by the associated pulse train has been made. Said receiving station tone may be generated by a relay 541 when the connection is made.

The relay 541 is a normally open switch which is slow-to-open after closing and is provided with a switching arm of the over-ride type which is actuated by the solenoid of the ring responsive relay 537 associated with the input 499L to the selected station 499. Upon closing, relay 541 energizes a tone signal generator 541', the output of which is transmitted through the completed circuit back to the sending station.

A relay 528 responsive to said receiving station connection-indicating tone generates a signal, when so energized, which is operative to open a normally closed switch 526 having an input from a tone operative relay 524 which is responsive to a tone reproduced from tape 506 a short period after the tone is transmitted from tone generator 541' but which does not last longer than the tone of 541'. Thus if relay 528 is not energized (indicative that the circuit has not been completed), the second tone in the group reproduced from 506 will cause a signal to pass through closed switch 526. The resulting signal is passed to a timer 530 which operates thereafter for reversing and recycling the tape to again reproduce the digital selection code just reproduced. The controller 530 may be a multi-circuit recycle timer having control circuits to all tape transport forward, stop and reverse motor controls to effect the desired motion to the tape.

The output of relay 528 is also passed to a time delay relay 532 which gates a power supply to the switching input of switch 526 at some time after relay 532, becomes energized to prevent the recycling action, resulting from the energizing of 530, from occurring after a predetermined time or number of recycling actions. Said output signal from 532 is also used to energize a recording head 522 positioned on a third channel of the tape 506 to record said signal alongside of or in a predetermined position relative the selection code signal for which the circuit connection was not made. So that the recycle timer 532 will not gate a signal to head 522 and the switching input to 526, if a connection has been made, at some time after said connection is made, timer 532 may contain a reset switch actuated by a signal from relay 528 which is indicative that the connection with the particular receiving station has been made. The reset input of delay 532 is thus connected to the output of relay 528, and 532 remains inoperative until its activating-input from switch 526 is again energized. It is noted that 532 may also be a counter adapted to transmit a signal to the switching input of switch 526 for a sufficient time period after a predetermined number of counts of the output of 526 to maintain 526 open, so that when tone relay 524 is next energized by the frame indicating signal reproduced by head 520, timer 530 will not become energized and the tape will continue its motion forward and will be provided wtih a signal recorded thereon indicating which station connection was not made. Said counter may be reset to zero by a signal transmitted from relay 528.

The switches 51 which connect the output circuit of the picture signal reproduction head 518 and the code signal transducer 520 with selected circuits in the telephone switching system 52, operate as their equivalent switches do in the apparatus of FIGS. 1 to 4. After the completion of all connections, the picture signal is reproduced followed by a tone signal to open all circuits.

The receiving station 499 illustrated in FIG. 5 is provided with a recording medium which is a magnetic tape 536 drivable past magnetic reproduction heads 544 to 549 by means of a tape transport 542 which is not shown in its entirety. The movement of the multi-channel tape 536 during the recording of a frame picture signal is controlled by a multi-circuit recycle timer 530' which like timer 530, controls the starting and stopping of the motors driving the reels and capstan of transport 542 whereby the tape 536 travels a predetermined degree while the picture signal is being transmitted over the completed circuit from pickup 518 and is being recorded on 536. Sequential controller 530' is initially energized by means of a tone responsive or coded relay 554 which gates a power supply or transmits an energizing pulse to 530' when energized by a tone or code signal which has been reproduced by the apparatus 500. The signal energizing relay 554 is derived from a reproduction of a recorded tone or pulse code provided on tape 506 and located thereon to be reproduced and transmitted over all completed circuits a predetermined time in advance of the reproduction of the associated picture signal therefrom such that the tapes 536 of all receiving units will attain constant recording speeds for effecting proper picture signal recording by the time the picture signal is transmitted thereto. So as not to record noise or the control tone signals on the picture signal recording channel of 536, the input to the recording amplifier 545 of picture signal recording head 544 is normally disconnected from the common input line 558 of the receiver unit and is connected by means of a bistable switch 556 which is controlled to close and open respectively during the transmission of the picture signal by means of tone signals provided at each end of the picture signal on 506. The first of said tone signals may be the signal energizing 554 and may be derived from the vertical frame sync signal of the video picture signal.

A recording head 546 is operative to record signals on another track of 536 which signals indicate the position of each picture signal thereon, and when later reproduced, may be used as frame sync signals adapted to trigger the deflection chains of a video picture tube 570 for visual monitoring or to effect the printing of a document. A picture signal reproduction pickup 548 is provided to reproduce from tape 536, the output of the amplifier of which is connected to the write beam of video writing or storage tube 570. As it may be required to reproduce only certain of the signals recorded on tape 536, a copy means is provided in FIG. 5 for visually monitoring the video information and, if it is decided to affect hard copy recording, manual control of copy printing means may be employed. A bi-stable switch 560 is employed in the circuit of a pickup 548 which, when closed, permits the transmission of the reproduced picture signal from pick-up head 548 to the video signal input of tube 570. The switch 560 is slow-to-open and is actuated to close by the frame sync signal reproduced from 536 by a pick-up head 549 riding on the same track as recording head 546. A manually operated switch 560' is provided between video pick-up head 548 and the video signal input to the storage tube 570 so that if an operator is not present to view the image recorded on the viewing screen of 570, the picture signal will merely be recorded on magnetic tape 536 for later monitoring. The switch 560' is also operable by one of two controllers **530*a* and 530''. Whereas the multi-circuit recycle timer or sequential controller 530' functioned to control movement of the tape 536 to effect recording a picture signal transmitted from sending station 498, no provision was made to control the storage tube 570 and to effect the printing of a hard copy derived from the transmitted picture signal. For many purposes it may be only necessary to magnetically record the picture signal on tape 536, monitor later and later selectively generate hard copy. A second sequential controller or multi-circuit recycle timer 530*a* is provided which may be operated locally by closing a switch 568 or from the picture signal transmitting station by means of a tone operative or coded relay 555 responsive to a specific tone signal transmitted thereto. Said signal may be provided as a recording at the correct position on tape 506 to be reproduced by head 520. When timer 530*a* becomes energized, it controls movement of the tape 536 whereby the next picture signal recorded thereon is reproduced by video reproduction head 548 which signal is amplified in amplifier 552 and passed to the picture signal input of storage tube 570 for modulating the beam thereof to provide an image on the tube screen face. Controller 530*a* also closes switch 560' and switch 560 is closed by the frame pulse reproduced by reproduction head 549 just prior to the reproduction of the picture signal therefrom. Another output of 530*a* effects erasure of the screen of tube 570 in advance of the new signal to remove the prior signal trace therefrom. Still another output of 530*a* is connectable through a switch 562 to the energizing input of another controller 530'' which may also be a multi-circuit timer of the self-resetting type utilized to effect the automatic printing of a picture or image on the screen of 570. The optical system 572 of the storage tube 570 contains a viewing screen 573 for viewing the image and a screen 573' adjacent a length of photo-sensitive paper 84 and separable therefrom by a shutter (not shown) but which is controlled to open and close after the image has appeared by means of a motor or solenoid operated by 530''. Timer 530'', like controller 70 of FIG. 1, controls such other actions as shearing or cutting of the paper 84 to proper length, the drive of servo means in the developing apparatus 92, drive of a conveyor for removing the print from 92 and/or of a stacking or collating machine. If it is desired to first monitor the image before determining to make a print thereof, the switch 562 may be manually opened. By closing a second switch 562' in circuit with the energizing input to 530'' and a power source, the operator may make one or more prints of the image he sees on the monitor screen 573 of the viewing apparatus. Although none of the motors for driving tape 536 are shown in FIG. 5, it is assumed that they are all controlled by timers 530' and 530 and automatic speed control means in the manner in which the drive of 500 is effected. A bi-stable switch 556 is provided in the circuit of the input to the recording amplifier of the picture signal recording head 544 and may be similar to the switches 51. Switch 556 may be opened and closed by means of respective tone relays 557 and 559 responsive to tone signals reproduced from tape 506 at the proper instants. Manual control for rapid forward or reverse travel of tape 536 may be used to indicate to the person monitoring the signals thereon which frame he is reproducing from. The tone operative relay 539 of switch 540 operates a solenoid opening the contacts 538 thereof upon receipt of a tone signal reproduced from tape 506 by head 520** at the end of the reproduction of the picture signal or signals desired to be transmitted to the receiving stations.

If a conventional telephone system is employed for effecting connections between the sending station and selected receiving stations provided in the systems of FIGS. 1 to 5, a conventional dial code generated on the line will cause a ring signal to close a switch such as 540 by energizing a ring responsive relay 537. While this will merely close switch 538 without actuating any of the tape transport apparatus or motors, it is desirable to open the contacts of 538 again and break the circuits between the input of the receiving apparatus and the telephone circuit input to the receiving station. To effect this action, a timer actuated switch 564 is provided which is also responsive to the ring signal generated on line 499L by the switching system. Switch 564 has a resetting input (not shown) from the controller or multi-circuit timer 530' so that if it (564) is not reset shortly thereafter, its output is connected to the actuating input of the solenoid controlled by tone relay 539 so that the bistable contacts 538 of 540 are closed by the closure of the contacts in switch 564 which gates a power supply thereto. Switch 564 permits the line 499L to also be used as an input to a conventional telephone receiver 565. So as to prevent conversation from being recorded on 536, the tone transmitted to energize 555 may be audible or may be used to energize a tone relay which opens a switch 565' between phone 565 and the line 499L. Switch 565' is closable by the same tone energizing relay 539 by means of another tone relay (not shown) but responsive thereto. It is noted that the relays 555 and 539 may be used to respectively open and close the switch 565′ by energizing respective solenoids which open and close bi-stable contacts thereof.

Modifications to the apparatus illustrated in FIGS. 1 to 5 are noted as follows:

FIG. 3 illustrates a record medium at the scanning station employing a plurality of images 42a which are shown as film or picture frames developed or printed in the film strip or paper 42. It is noted that member 42 may also be a conveyor belt carrying the individual pictures, photographs or sheets thereon in spaced apart relation. The sheets or papers 42a may be merely placed on 42 by manual or automatic means. If manually placed, marks on the belt 42 may be used for precise spacing. The belt 42 may also contain fastening means for positioning and securing the individual sheets 42a or pictures. Clips may be used, fastened to the belt at precise spaced apart positions for securing the pictures or sheets 42a in the correct spacing. The magnetic strip 42c need not be integral with 42 but may be a separate tape synchronized in motion to the movement of 42 by gearing or other means, coupled to the transport for said tape.

The pictures or frames 42a may also be provided on punched cards automatically fed to, positioned and removed from the scanning field of camera 44 by known feeding means synchronized in operation by the multi-circuit recycle timer or controller 12 of FIG. 2 for example. The code and selection signals may be recorded photographically on each frame and reproduced for said selection and control functions by a photomultiplier tube or tubes reading a border area of each photograph or page to be scanned. The punched cards may contain digital information in the form of holes therein, which when read as said card, is positioned or fed to a scanning means producing said digital code signals which are transmitted over the output 48 to all the circuits connected to the switching system 52 through the output switches 51 for effecting the described automatic receiving station connections.

FIG. 6 is a schematic diagram showing the signal transmitting means of FIG. 5 modified for the simultaneous transmission of a plurality of digital selection signals as pulse trains to the switching system 52 so that the time required for total signal transmission is substantially reduced. Instead of utilizing a single recording track for controlling and effecting circuit selections as in FIGS. 1 to 5, the tape 506 shown in lateral cross-section in FIG. 6, is provided with a plurality of recording tracks C. On the first track or channel C1 is recorded the described video picture signals in tandem and in positions to be reproduced by the pick-up head 518 after all digital switchinng and control signals for making circuit connections have been reproduced and said connections have been made. Pick-up heads 520a, 520b and 520c each ride on a respective track and simultaneously reproduce the described tone and/or digital selection signals necessary to respectively close respective output switches 517a, 517b and 517c to the switching system inputs and select the predetermined receiving station to be connected to the output 523 of the video amplifier 519. Thus all selected circuits are simultaneously made and there is no need for one connection to await the connection of another selected circuit. The tone signal energizing the relays 554 or 555 of all receiving stations is recorded on track C1 in advance of the recording of the picture signal.

In the event that all commanded connections are not made, it may be desired to recycle the tape and repeat the operation or indicate which of said selected connections has not been made. This may be effected in one of several manners. If the described tone generator 541′ of each station is preset to generate said tone for transmission back to the sending station at a time other than that at which a similar tone is generated from all the others, all the tones may be recorded on different lengths of a single channel CN of tape 506. The position where a tone is not present is indicative of which of the selected circuits were not connected. A normally open switch 575, closeable for a predetermined period during which all tone signals are received by station 498′, may be used to connect the input 574 of the recording head 520N recording the chain of tone pulses on channel CN. The switch 575 may be closed for the predetermined time by a signal reproduced from an adjacent channel CN′ by a respective reproduction head 520N′ for the time necessary for all receiving station tones to be received and transmitted through 575 for recording on channel CN. Automatic indicating means employing a counter may be used to indicate which circuit connection was not made. If the system contains a large number of receivers, the relays 541′ may code-emitting circuits, each of which is adapted to transmit a different code at a different time so that the code which is not recorded on CN is indicative of which connection was not made. By using code matching means, the missing codes may be rapidly determined. For a system employing the recording of different time generated tones, the length, or position of the tone may be used to indicate which circuits were completed and which picture signals recorded.

FIG. 6′ shows circuit means for determining which of the selected circuit connections were not made due to failure to make a circuit connection through the automatic switching system. A reproduction head 520N″ rides on a channel CN of the tape 506′ on which has been recorded the tone signals through recording head 520N of FIG. 6. Recorded on an adjacent channel CK are a plurality of signals adapted to be reproduced simultaneously with the reproduction of the signals recorded on CN. One of said signals recorded on CK is of a duration such that a respective connection indicating signal recorded on CN, if present, will be reproduced during the reproduction of said respective signal. The outputs of heads 520N″ and 520L are connected to a logical "AND" switching circuit 520NA which produces an output if its two inputs are simultaneously energized. An output from 520NA opens normally closed switch 520NC which prevents the signal reproduced from channel CN′ from passing to the energizing or actuating input of an analog to digital converter 576. If both signals are not present at gate 520NA, the signal is passed through switch 520NC and the digital converter is pulsed causing it to emit a binary code which is indicative of which of the selected circuits were not completed. The code may be transmitted to conventional binary controlled switching means to gate the selection signal through the transmitting station video output 523 for the retransmission of the picture signal. The digital converter 576 is activated by means of a relay 577 responsive to the tone signal reproduced from tape 506 by head 518 which was used to energize tone generator 45′ of relay 541. Since circuit connection time will not be a constant, the relay 577 is preferably energized by the signal transmitted back to the sending station and generated by the first of the tone generators 541′ to become energized.

The notation 576′ refers to a shift register connected to the output of the binary converter 576 which provides the parallel code thereof as a series code which is recorded on tape 506′ by a recording head 520K. If the tone generating means 45′ or 541 of each receiving station in the system are of a different time constant such that each is adapted to become energized and emit a signal at a different time than the others, then an output from converter 576 will be indicative of which of the receiving stations did not transmit a connection indicating signal on the connected line back to the transmitting station 498′. The notation 501A refers to a diode in the output circuit of head 519. It is also noted that the tone generators such as 45′ or 541 may be replaced by code emitting circuits each adapted to emit a specific code at a different time which may be recorded onto specific lengths of track CN by means of FIG. 6. Absence of a selected code thereon is an indication of which circuit was not completed. However, as this would require a code matching system involving the recording of all codes from connected stations and the automatic determination thereafter of which of the codes is not present, a more direct approach may be attained as follows. In FIG. 4 the tone generator 45' of the receiving circuit emitted a tone indicative of the completion of said circuit which was transmitted back to the sending station. In FIG. 5, this was accomplished when relay 541 was energized as the circuit was completed. If the notations 541 or 63, or 45' comprise switching circuits which emit specific codes when energized and each receiving station is provided with such a code emitter adapted to emit a code which is different from codes emitted by the others during a time interval different from that during which all the generators emit codes, then the codes from all receiving stations may be matched with codes of the same characteristic. If switch 575 is a normally closed, slow-to-close after opening electronic gate in the output of head 520N' the signal passed through 575 will be indicative of the circuit which was not completed due to the fact that switch 575 was not opened by the code or signal from the respective connected receiving station at the time the similar code was reproduced from tape 506. The reason 575 is provided slow-to-close is that once it is opened, it will remain open long enough to prevent the passage of any part of the code reproduced from CN' to the recording head 520N and differences between the synchronization of the motion of the tape 506, the recordings thereon and the actions of the code emitting circuits of the receiving stations will be accounted for.

In FIGS. 5, 6 and 6' notations 501 refer to diodes which serve as one way gates. For example, diodes **501*a* and 501*a*' are utilized in FIGS. 5 and 6 so that only the signals reproduced by head 518 will pass over the output of the amplifier thereof in the direction of the output of said sending station and signals received on the common line 523 will not pass to the output of the amplifier. The notation 580 of FIG. 6 refers to a transformer having a single input from video amplifier 519 and outputs to transmit the picture signal reproduced by head 518 to all circuits which are connected with switching system 52**.

A number of variations are noted in the apparatus of FIG. 5 and 6. For example, the elongated magnetic tapes of either or both the transmitting and receiving recording means may be replaced by magnetic strips, cards or discs of the type shown in Pats. Nos. 2,650,830 and 2,658,762 with both selection and picture signals provided on the recording means of the sending station at intervals such that continuous movement of the recording medium relative to the reproduction transducer may be effected. Intermittent operation of the tape transport or record disc may be employed by providing a signal on a separate track of record member 506, reproducing said signal after the selection and connection signals have been reproduced and using it to energize the stop control S of tape drive servo 516.

If photographic or magnetic record bearing punch cards are employed at either or both the transmitting and receiving stations of the circuitry of FIG. 5, the feed of either or both will be controlled and interlocked to the operation of the apparatus at the other station by means of tone or coded relays operative in one or more of the manners hereinabove described. The holes of the punch cards, if said cards are provided at the sending station, may be read to provide the desired digital selection codes. One or more holes may be provided adjacent thereto for operating switches connecting tone generators as described while the common output line or the cards may contain coded holes for generating coded pulse trains adapted to energize coded relays to perform the functions of switches and relays 541, 555, 554, 556, 565', 564, etc. Such cards, if applied to the sending station, may be driven intermittently in a manner such as to effect the reproduction of a specific circuit selection code or pulse train by a controlling servo motor or solenoid to effect a brief movement of the card by the signal output of coded or tone responsive relay 528. The final movement of the card, before its ejection from the reading mechanism, will be that to effect the positioning of the picture or film image portion thereof in the scanning field of the video camera.

Manual or automatic selection means for the generation of selected of the multiple picture or record signals provided on the recording medium 506, 42 or the mentioned disc or cards, for transmission as picture signals to selected receiving stations, may also be provided.

FIG. 7 is a schematic diagram of the scanning apparatus of the picture signal transmitting station at which video signals are derived from photographs or microfilm contained on punch cards. For that part of the system not shown including the automatic switching system and details of the receiving apparatus, reference is made to FIG. 5 although with some minor modifications, the principles of operation of the apparatus of FIG. 7 may be applicable to FIGS. 2 and 4. The apparatus of FIG. 7 comprises a card stacking and feeding device 590, the mechanism of which is driven by a servo motor 593 for selecting a punched card containing a document or print to be scanned and moving it into the scanning field of a video camera 44 and for removing said card after the picture information thereof has been scanned and the resulting output of camera 44 has been transmitted to one or more receiving stations connected to its output. A second servo-motor 594 is shown operative to drive a conveyor 591 of the endless belt type on which said card has been placed by the mechanism of 590 and to stop the belt 591' of conveyor 591 with a selected picture or selected part of the card in said scanning field. The placement of the card with the part thereof to be scanned in said scanning field may be accomplished by known card moving and separating mechanisms and feed. The notation 597 refers to a device for receiving cards one at a time from the belt 591 and for stacking or collating said cards. The input to feeder 590 may be from an automatic card selection means whereby selected of a plurality of cards and hence selected pictures or images may be rapidly obtained for transmission to selected receiving stations as commanded by cut-outs, notches or recordings on the picture cards or on other cards handled also by 590. The notation 592 refers to the output of a card reading mechanism associated with feeder 590 which reads the punchings or recordings on the picture containing cards or digitally punched cards fed simultaneously thru 592, each adapted to be read during or prior to the movement of a picture, card or document-recording into or through the scanning field of 44. The signals generated on output 592 may be used to perform the switching and control functions of the selection and code signal reproduction heads of FIGS. 2 to 6. Two outputs of card reader 592 are connected to the energizing inputs of tone generators 554' and 555' which function in the manners of tone generators 554 and 555 of FIG. 5. Another output of 592 extends directly to the common output circuit 48' as does the output of camera 44 and the resulting generated digital pulse trains are transmitted thereon as the card moves through the reader 592 and digital codes are generated as switches in 592 open and close in sensing or reading the card punchings or recordings. As in FIG. 5, a multi-circuit self recycling timer 530 is provided in FIG. 7 and controls the operation of the servos 593, 594 and 595 driving the card handling devices described in a manner whereby the belt 591 is moved a predetermined distance after receiving the card from 590 and stops such that the document recording disposed thereon from 590 is in the scanning field of camera 44 and, shortly thereafter when scanning has been completed, the card is conveyed out of the field and the next card to be scanned is automatically positioned therein for scanning.

Further details of the apparatus of FIG. 7 are noted. In the event that the tone responsive relay 528 is not energized, which is indicative that the connection of the output 48 of video camera 44′ has not been made with the selected station or reading of the card and is not effected by the card reading means of 592, means are provided for ejecting the card from the belt so that it may be segregated and later fed either manually or automatically fed to the card reader, in a further attempt to transmit the information or picture signal derived by scanning the card, to a selected receiving station. Ejection is effected by means of a solenoid 596 having a pusher arm mechanism 596′ coupled or secured thereto which is adapted to sweep across the conveyor belt 591′ of the card feed conveyor 591 and remove the card therefrom and cause it to fall into a collection bin or chute (not shown). This action is effected by means of a time delay relay 530T which is energized by an output of multi-circuit time 530. The delay relay 530T is reset by a signal obtained from the described tone or code responsive relay 528 and passed to the reset input of 530T before said delay relay becomes energized and energizes solenoid 596. The output of 530T is also passed to the energizing input of sequential controller 530 so that the next cycle will automatically initiate even if the prior command connection with a receiving station was not completed. If relay 528 is energized by a tone transmitted thereto over the connected circuit from the receiving station, its output is passed to reactivate controller 530 and reset time delay relay 530T so that the next cycle will occur without rejection of the card. The notation 598 refers to a manually operated switch for energizing controller 530, for initiating the first cycle thereof. Notation 44L refers to a light source for illuminating the image of the card in the field being scanned. If separate cards are employed for scanning and for generating selection and control signals, they may both be fed on the conveyor 591 side by side or in tandem so that a single ejector such as 596 may be employed to remove both from the belt or they may be removed therefrom one behind the other and arranged in related positions in separate stacks. The stacking of the cards in 590 may be effected by known automatic card selecting and sorting apparatus.

FIG. 8 illustrates a record signal document image frame containing card applicable to the apparatus of FIG. 7. The card 600 is shown having one or more images or prints in tandem order and occupying areas F1, F2, etc. which are centrally provided thereon in predetermined relation to the edges of said card to permit their automatic positioning in the image field of the scanning camera. The card also contains a plurality of punchings or cutouts 602 provided along different longitudinal tracks T–1 to T–6 which actuate electro-mechanical switching means comprising one or more switches each adapted to scan a respective track as the cards are moved. Said cutouts 602 and/or document recordings F may be replaced by signals recorded on magnetic recording material coating or covering said entire card or the respective strip areas thereof where said tracks are located. The cutouts 602 may also be replaced by printed codes in approximately the same locations illustrated to be scanned by banks of photomultiplier tubes to derive the mentioned selection and connection codes.

Card coding is provided as follows: A code is provided on track T–6 for identifying the card as one of a plurality of said cards in order to effect scanning and transmission of only selected information to selected receiving stations. Track T–6 is thus provided to be read first by reader 590. Track T–1 contains recordings for energizing a respective of the relays 51 which are operative for closing a respective of the output switches 51–. If said output switches 51– are operated by means of a rotary or sequential selection means, the output of the card scanning transducer 604–1 may be used to step the selector thereof. A plurality of tracks such as T–1 may also be provided with outputs which are connected to a respective switch of the plural output switches 51– each of which is activated by a respective signal or reproduced from a respective track recording and located so as to be reproduced just prior to the reproduction of a respective selection and connection code from tracks T2 and T3 thereby simulating the act of dialing for a connection. Track T–2 contains recordings of lengths such that signals will be produced as said card is moved relative reproduction transducer 604–2 which will simulate the switching block transfer action when the conventional dial switch rotates to zero position. Each of the punchings or signals on T–2 is provided in positions to be reproduced just after a number being selected has been reproduced and provided by the transducer or switch 604–3 riding on track T–3. Track T–4 contains punchings or signals adapted, when transduced therefrom for actuating a switch 604–4 to close, to energize a tone or code generator 555′ which provides a signal on the line 48′ to energize the relay 555 of the receiving station for performing the function described in FIG. 5. Similarly, track T–5 contains a recorded signal which, when reproduced therefrom by pick up 604–5, which energizes a respective tone or code generator 554′ which energizes relay 554 shown in FIG. 5 for performing the function described. In short, the signals recorded on 600 are provided to simulate the same connection functions effected by the signals recorded on the tape 506 of FIG. 5 and further modifications may be made in the transducing and recording means of FIG. 8 to simulate the other functions described elsewhere herein. A seventh track T–7 is provided with recordings which are operative to hold the card in position until a connection has been made before resumption of scanning to effect next scanning of selection switching and connection codes. Means for positioning a selected frame or document recording in the scanning field of the video transducer may also be provided in the form of cutouts or recordings on still another track (not shown) which are operative to actuate a switch such as 41 of FIG. 2 to stop the drive means for said card at required moment whereby said selected frame is positioned in said scanning field.

FIG. 9 is a diagram showing means for effecting automatic control of the motion of the tape 506 of FIG. 5 in the act of recycling or repeating its scanning movement past transducers 518 and 520 to effect the function of generating selection and connection signals to effect circuit connections with receiving stations in the system which were not connected during prior type scanning, due to such conditions as the terminal line being out of order, in use, etc. In FIG. 5, means was provided for recording a pulse signal on a track or channel of tape 506 when a connection was not made. Said signal is positioned on 506 relative to the recording of the selection code related to the not-completed connection, so that later reproduction of said signal may be used to effect the reproduction of the said selection code in a further attempt to complete said connection. Means for recycling the tape and reproducing any code pertaining to a connection which was not made, has been described for FIGS. 4 and 5. In FIG. 9 means are provided for recycling all or part of the tape 506 at some time after all or part of the picture signals thereon have been scanned and transmitted, where connections have been made, so that all connections which were not made may again be attempted after a sufficient time lapse during which many of the lines in use will have been disconnected from the telephone switching system.

Shown only in FIG. 9 are the tape 506, reproduction heads, an erase head and certain of the control components pertaining to the rescanning function. It is assumed that the components of FIG. 9 are applicable to the system of FIG. 5 with the few modifications described hereafter. It is noted that the rescanning means of FIG. 9 may also be applied to FIGS. 2, 4 and 7 by making respective changes in the other described systems in accordance with the teachings of FIG. 9. The belt 42 of FIG. 3, for example, may be modified with a wider magnetic band 42C to accommodate the multiple heads of FIGS. 5 and 9. The card 600 of FIGS. 7 and 8 may have multiple magnetic recording channels thereon replacing the punchings or at least one channel for recording indicating signals thereon which are erasable after the connection has been made and the picture signal transmitted to the connected station.

Recording and reproduction channels C–1 to C–5 are provided on the recording tape 506 of FIG. 9. Channel C–1 contains any signals which may have been recorded thereon by head 522 indicative that a commanded connection was not made which signals are located in a position whereby they relate to or indicate those codes associated with the connections not made. A reproduction head 522' rides on C–1 for reproducing any such indicating signals denoted PN1. Channel C–2 contains the selection and connection codes, one of which is denoted CDNN in FIG. 9. The code CDNN contains groups of short pulses each of which group digitally simulates a code such as one indicative of a number dialled, which when reproduced therefrom, and used to pulse the line connection with the automatic switching system or as transmitted on a voice wire circuit in a conventional dial phone system, will be operative to effect a particular line connection when generated with other pulse trains simulating other portions of the number dialled. On channel C–3 is recorded picture or information signals referred to by the general notation PSN. Each of said picture signals is recorded on tape 506 in a position to be reproduced therefrom after all the selection and connection codes on C–2 associated with said codes have been reproduced and transmitted and upon indication that the selected connection is completed. Recorded also on C–3, but not shown, are signals for energizing the tone or code responsive relays of the output switches 51–. The closing signals are positioned in predetermined positions relative to the selection codes on C–2 such that respective of said C–3 signals are reproduced sufficiently in advance of a related selection codes to close said branch output switches 51– before the rest of the related selection code is reproduced. On channel C–4 are recorded a series of recording indicating signals which are erasable after the connection has been made and the picture signal transmitted to the connected station.

Recording and reproduction channels C–1 to C–5 are provided on the recording tape 506 of FIG. 9. Channel C–1 contains any signals which may have been recorded thereon by head 522 indicative that a commanded connection was not made which signals are located in a position whereby they relate to or indicate those codes associated with the connections not made. A reproduction head 522' rides on C–1 for reproducing any such non-connection indicating signals. PN–. Channel C–2 contains the selection and connection codes which are referred to by notations CD–N–. The code CD–NN illustrated in FIG. 9 contains groups of short pulses each of which group digitally simulates on selection number of the code such as a number dialled which when reproduced therefrom, and used to pulse the line connection with the automatic switching system or as transmitted on a voice wire circuit in a conventional dial phone system will be operative to effect a particular line connection when generated with other pulse trans simulating other portions of the number dialled. On channel C–3 is recorded picture or information signals referred to by the general notation PB–. Each of said picture signals is recorded on tape 506 in a position to be reproduced therefrom after all the selection and connection codes on C–2 associated with said codes have been reproduced and transmitted and upon indication that the selected connection is completed. Recorded also on C–3 but not shown are signals for energizing the tone or code responsive relays of the switches 51–. The closing signals being positioned in predetermined positions relative to the selection codes on C–2 such that respective of said C–3 signals are reproduced sufficiently in advance of a related seelction codes to close said branch out switches 51 before the rest of the related selection code is reproduced. On channel C–4 are recorded a series of signals P2N which are positioned thereon to be reproduced by a magnetic pick-up head 520A to stop the drive means 514 for said tape at the end of each selection code, which tape remains stopped until started again by the described feedback signal transmitted from the connected receiving station. If all signals are spaced sufficiently apart on tape 506 to permit sufficient time delay between the reproduction of each selection code for the connections to be made, the tape may be run continuously, and head 520A as well as the signals reproduced thereby, will not be needed. Since, in rescanning it will not be desired to stop said tape at the end of each selection code, a manually closable switch 520A' between switch 520A and the stop control S of drive means 514, is provided to break said circuit. On channel C–5 are recorded tone or code signals P3N reproducible by a pick-up head 520B which, when reproduced thereby and transmitted to the output line 48B, energize all the switches 51 opening all closed switches in bank 51. The signals P3N may also be provided at the end of respective video picture signal recordings on C–3.

As the tape 506 is driven in the direction of arrow "A," head 522' reproduces a signal PN on the output thereof which is connected to actuate a normally open switch 610 to close, which switch is slow to open and is operative to gate a power supply over two output lines thereof. One of said output lines is the switching input of a monostable, normally open switch 612 having an input connected to the code signal reproduction head 520 riding on channel C–2. The time constant of 610 is sufficient to maintain 612 closed for sufficient time to gate the entire reproduced signal CDNN therethrough. Thus all CDNN codes are positioned on channel C–2 so that the lead pulse of each is always the same distance from the lead or first pulse of the prior and next code, the distance being at least that required to record the largest number in the system along the length of tape between lead pulses of each code. The time constant of switch 610 maintains 612 closed while the entire code and the length of tape up to the next code passes head 520. The other output signal of 610 is passed to energize a time delay relay 614 which produces an output for energizing the stop control S of tape transport drive motor 514 after switch 612 next opens. The tape 506 remains stopped until the start input F of motor 514 is energized by the feedback signal from the selected station if connection is made, a function which is performed by the control 526 and has been described. The tape is then driven in the direction of the arrow "A" until the picture signal PB–N associated with the circuit indicated by signal PNN is reproduced whereafter signal P3N is reproduced effecting the mentioned circuit disconnection. The tape continues in its motion until again stopped by the means described after reproduction of the next PNN signal therefrom.

In FIG. 9 means may also be provided for automatically effecting erasure of the PNN signals from channel C–1 if the connections controlled by the selection code associated therewith are made. If the feedback signal responsive relay 528, described in FIG. 5, produces an output signal which indicates the successful completion of the selected connection, the output of relay 528 may also be passed, in addition to the input of start control F of tape drive motor 514, to a control for energizing a magnetic erase head (not shown) riding on channel C–1 at a time such that the PNN signal associated with the circuit connection code is approaching said erase head and for a duration sufficient to effect magnetic erasure of said signal. Thus, if the tape 506 is again recycled to effect the transmission of signals to any receiving stations which were not transmitted during the second try or recycle, only signals pertaining to said selection codes which did not effect a connection, will remain.

FIG. 10 shows automatic signal transmitting and receiving apparatus of the type heretofore described comprising a signal generating and sending station 700 connectable by wireless transmitting means 701 to selected of a plurality of receiving and recording stations one of which, 710N, is illustrated. The notation 499' refers to an arrangement of receiving station components similar in function to those shown in FIG. 5 and referred to by the notation 499 except having modifications thereto as hereafter noted. The signal output line 48B of signal generating and recording apparatus 498' is connected to a conventional radio broadcasting transmitter unit 701 for transmission by means of an antenna 701' of the signals generated on output line 48B as short wave picture or information signals which are reproduced from tape 506 and transmitted on a predetermined broadcasting frequency or band. Each of the receiving stations has a conventional radio receiver unit 704 tuned to the frequency at which 700 transmits for receiving signals by means of respective antenna 704'. The output of the receiver 704 is transmitted over an input line 705 to the input of 499' which connects to three branch circuits. The notation 537' refers to a coded relay adapted when activated to close two switches 538' and 541. Relay 537' becomes energized upon receiving predetermined code or tone signal from the sending station 700. Each switch closing relay 537' at each receiving station is energized by means of a different code and selection of certain of said receiving stations to receive a signal or signals transmitted thereafter from 700 is effected by the reproduction of respective codes from the tape 506 of signal generator 498', each of which codes is adapted to actuate respective of said input switch closing relays 537' of respective receiving and recording stations 710–. When switch 538' is closed, the output of 704 is connected to the recording and control means shown in FIG. 10 which may also include all or most of the circuitry illustrated in FIG. 5. The normally open switch 541 has been described and is temporarily closed by the actuator or energizing means of 537' to energize a code generator 541', the output of which is connected to a radio transmitter 706. A receiver unit 702 at 700 is adjusted in bandwidth or frequency to receive the signals generated by 541 and transmitted from 706. The code or tone generators 541' of all receiving stations are each adapted, when energized, to generate two codes or a tone and a code, which codes are different from each other. The described relay 528 or 498' is responsive to the first tone or code and functions when activated thereby in the manner described. The second code or part of the signal generated by 541' is preferably a code specific to its receiving station. When transmitted to sending station and received by radio receiver 702 thereat, it is passed over input line 703' thereof, a branch of input 703, to a recording head 522B and is recorded on a respective channel of tape 506. Said recorded code is indicative that the connection has been made and may be provided as a record indicating said connection. If the code is not transmitted, an indication is had that either 541' or 541 is inoperative or that the communication link between the two units may have been established and the recycling means described for FIG. 9 may be employed thereafter to again attempt to establish said link or the means provided in the description of FIG. 4 may be employed immediately after the apparatus has detected failure to establish such a link. The relay 539' is provided with means, operative when it is energized by a code or tone reproduced from 506 after the reproduction and transmission of the required picture or information signal or signals, for opening switch 538'. Switch 538' may be a double pole, double throw switch adapted when closed by 537', to also complete a circuit between transmitter 706 and its power supply so that transmitter 706 will not require peak power when said apparatus is inoperative and is in a condition of awaiting the receipt of signals from sending station 700.

It is noted that a modified form of the apparatus described and illustrated in FIG. 5 may be utilized to transmit information other than facsimile or video information over an automatic switching system such as an automatic telephone switching and connection system. For example, voice generated messages such as dictated into a microphone at the sending station may be recorded onto the magnetic recording tape 506 of FIG. 5 or other suitable recording medium such as a magnetic card, tape casette or cartridge may be used, together with switching and connection tone or code signals generated by the person making the recording to effect the automatic transmission of his messages to selected telephone terminal circuits for their selective playback by one or more parties at the receiving stations from a magnetic recorder recording such messages automatically as provided for in FIG. 5. FIG. 11 illustrates components of such a message transmitting and distribution system, denoted 800, which may include all of the components shown in FIG. 5 to permit the automatic transmission and recording of both facsimile and audio information or may be provided with just those components and sub-systems necessary to effect the automatic transmission and recording of voice generated messages. A microphone 801, having an output 802, is operatively connected to the recording head 803 of the magnetic tape recorder 500 described above for recording audio voice signals on said tape 506 when the recorder 500 is operative. To effect the automatic transmission of messages, code or tone signals, representative of the destinations of the messages, are recorded on the tape 506 between each message by the operator or person who generates the voice messages. These signals preferably include the described tone signals necessary to control the operation of the recording apparatus at one or more receiving stations as described to record one or more messages in tandem along the tape of the magnetic recorder 542 at the receiving station but do not include the signals necessary to operate the timer 530*a* for controlling the recorder to reproduce messages.

In FIG. 11, the operator may generate switching signals and the described tone control signals by operating either a keyboard 806 containing a multiplicity of push button switches or keys operative when depressed to generate different tone or code signals on an output line 807 connected to the input 802' to the recording head 803. The operator may be provided with manually operated start, stop and reverse controls or inputs forming part of a control panel 808 for controlling the motors operating the magnetic recorder 500, or the operation of the recorder may be effected in an automatic manner when the code signals are generated and/or when the microphone 801 is activated by pushbutton switch or voice operated relay means. The operator of the apparatus 800 also has the option of inserting cards containing recordings of the desired code or tone information necessary to effect an automatic telephone circuit connection between the output 48*b* of the magnetic recorder 500 and one or more selected receiving stations as described, into a card reader 804 which operates automatically to generate said code signals on its output 805 which is connected to the input line 802' of the magnetic recording head 803. The card reader 804 may also contain a card activated circuit 805' for starting the motors driving the tape 506 of the magnetic recorder-reader 500 when a card is inserted therein and retain said motors operating until the card is completely read whereafter the operator's voice or operation of a record switch may be operative to start and stop the tape drive motors to effect the proper recording of voice generated messages as dictated. By properly operating the forward, stop and reverse tape drive switches F, S and R of the tape drive control unit 516, the operator may play back reproductions of his recorded messages through a speaker 811 which, as in a conventional magnetic tape dictating machine, is operatively connected to a magnetic pick-up head 812 when a reproduction controller 810 is activated by means of a manual control switch 809.

Also shown in FIG. 11 is an apparatus 813 such as an auxiliary message recorder-reproducer unit for reproducing selected messages as controllably operated by the operator at the sending station which messages may contain destination codes as described or may have some inserted by the operator by operating the card reader 804 or push-button switchboard 806. Notation 813 is an audio code signal generator. It may also comprise a computer operative to compose and/or otherwise generate audio messages in verbal or code form together with the described switching and connection control signals for the automatic transmission of said mesages to their destinations when the recorder-reproducer 500 is operated as described. Various other modifications to the apparatus of FIGS. 5 and 11 may also be made to provide a fully automatic information generating and distrbution system for automatically transmitting facsmile, verbal and code information between subscribing or user stations connected by short wave, wire and or micro-wave means.

Numerous other modifications of the present invention will be appreciated by those skilled in the art, and accordingly, the appended claims should be construed broadly as is consistent with said claims and, in certain instances, some features of the invention will be used without a corresponding use of other features.

In a modified form of the instant invention, it is noted that the information actually transmitted to and recorded at the receiving stations from the sending station many include, in addition to facsimile, audio or information representative of characters, further code information in the form of tones or pulse codes which serve to identify the transmitted and recorded information so that it may be properly reproduced or further distributed. This function may be effected by, for example, including said further code information in the facsimile signal or recording it with the facsimile signal at the sending station so as to be generated as one or more tones or pulse codes prior to, with or after the generation of said facsimile signal so as to be recorded at the receiving station therewith. If the information to be transmitted is analog, audio or digital information, such identifiying tone or pulse codes may be generated and transmitted before, with or after the transmission of the information signal and recorded at the receiving station therewith for identifying same thereat. In the arrangement of FIG. 2, such identifying signals may be recorded optically on or between each frame to be scanned on the belt 36 while in the arrangement of FIG. 5 the frame or message identifying signals may be magnetically recorded between each information signal recording or on a track adjacent thereto. In the card reading arrangements of FIGS. 7 and 8 the frame and/or card identifying signals may be recorded either between each frame of image information to be scanned or on adjacent recording tracks of the card. In the message signal generating means of FIG. 11, the keyboard signal generator 806 may be utilized to generate selected tone or code signals representative of the person to whom the message is to be routed and such representative signals may be recorded after the recordings of the switching and connection signals and located so as to be reproducible after a connection has been made to the input of the magnetic recorder of the selected receiving station or telephone terminal circuit.

What is claimed is:

1. A signal communication system comprising a signal sending station and a plurality of receiving stations, said sending station including means for generating and transmitting signals including a plurality of information elements and code signal elements, electronic control means for controlling the transmission of selected information to selected ones of said receiving stations, said electronic control means also including means for receiving and storing signals, said plurality of receiving stations each having circuit means responsive to respective of said code signal elements for use in preparing each receiving station to receive information elements, said receiving stations also including circuit means for receiving said code signal elements and operative in response thereto for transmitting a control signal to said sending station, means at said sending station responsive to said control signal for initiating the transmission of aid information elements and means at said receiving stations operable after all the information elements have been received for transmitting a signal to said sending station indicating the end of the receiving operation.

2. A signal communication system comprising:

a sending station, a plurality of receiving stations, master control means for controlling the transmission of selected information from said sending station to selected ones of said receiving stations, said master control means including means for storing a plurality of information signals and a plurality of code signals and means for scanning the stored signals and generating corresponding electrical information signals and associated code signals, said receiving stations also including circuit means for receiving certain of said code signals and operative in response thereto for transmitting a control signal to said sending station to initiate the transmission of information signals, recording means at said ending station for recording a signal indicating the failure to effect proper communication between said sending station and the receiving stations as sought by the generation and transmission of code signals by said sending station, transducing means associated with said sending station recording means for reproducing said indicating signals recorded thereby, means for operating said sending station recording means at a time after a failure indicating signal has been recorded thereby so as to cause said transducing means to become energized when presented with said recorded indicating signal and to generate a further control signal in response to said recorded indicating signal, said control means including further control means for regenerating code signals stored thereby, said transducing means being operatively connected to said further control means for activating same when energized whereby a code signal previously applied in an attempt to establish a communication link to a selected receiving station is regenerated and applied in a further attempt to establish communication between said sending station and said receiving station to permit the associated selected information signals to be transmitted to said receiving station.

3. An automatic communication system comprising in combination with a sending station having transmitting means and a remote receiving station having receiving means operative to receive signals from said sending station, an information signal generating means at said sending station operatively connectable to said transmitting means, said signal generating means including a plurality of document recordings, means for scanning said recordings and generating a plurality of picture signals, a signal recording means at said receiving station including a recording transducing means operatively connected to the input of said receiving means, means for automatically coupling the output of said sending station with the input of said recording means at said receiving station prior to picture signal transmission including means at said sending station for generating a plurality of switch activating signals and for transmitting said switch activating signals to said receiving station, said switch activating signals including first signal means in the form of a first code, first relay means connected to the output of said receiving station and responsive to said first code and operative for conditioning and recording transducing means for recording picture signals received from said sending station, means at said receiving station operative upon the activation of said first relay for generating a feedback signal, means at said receiving station for transmitting said feedback signal to said sending station, receiving means at said sending station for receiving said feedback signal, a further relay at said sending station operatively connected to its receiving means and responsive to said feedback signal, said further relay being operative when energized to activate said picture signal generating means to generate picture signals for transmission to said receiving station and means at said receiving station for recording picture signals transmitted thereto as hard copy.

4. An automatic communication system comprising in combination with a sending station having signal transmitting means and a remote receiving station having a receiving means operative to receive signals from said sending station, an information signal generating means at said sending station operatively connectable to said transmitting means, said signal generating means including a plurality of document recordings, means for scanning said recordings and generating a plurality of single frame sweep video picture signals, a signal recording means at said receiving station having a recording transducing means operatively connectable to the input of said receiving means, means for automatically coupling the output of said sending station with the input of said recording means at said receiving station prior to signal transmission including means at said sending station for generating a plurality of switch activating signals and for transmitting said switch activating signals to said receiving station, said switch activating signals including first control signal means in the form of a first code, a first relay connected to the input of said receiving station and responsive to said first code and operative for conditioning said recording transducing means for recording picture signals received from said sending station, means at said receiving station operative upon the activation of said first relay for generating a feedback signal upon receipt of said first activating signal, means at said receiving station for transmitting said feedback signal to said sending station, receiving means at said sending station for receiving said feedback signal, a relay at said sending station operatively connected to its receiving means and responsive to said feedback signal, said relay being operative when energized to activate said information signal generating means to generate picture signals for transmission to said receiving station which are recorded thereat and means at said sending station operative upon the termination of the generation of information signals for transmitting a second control signal to said receiving station, a relay at said receiving station responsive to said second control signal and operative upon receipt of said second control signal for deactivating said recording means.

5. An automatic communication system in accordance with claim 4, whereby said information signal generating means includes a conveying means for a plurality of individual document recordings, means for scanning said document recordings and generating picture signals and servo means responsive to said further relay means for operating said conveying means to present individual document recordings in the scanning field of said scanning means.

6. An apparatus in accordance with claim 5, including an erasable recorder for said picture signals at said receiving station, said recording means including means for generating hard copy, said erasable recorder having an erasable recording medium, transducing means for said information signals operatively coupled to transduce and record information onto said erasable recording medium, a reproduction transducing means operatively coupled for scanning and reproducing signals from said erasable recording medium, said reproduction transducing means being operatively connected to said hard copy transducing means, means at said receiving station for visually monitoring images derived from signals recorded on said erasable recording medium prior to making hard copy, and control means at said receiving station for reproducing selected signals from said erasable recording medium and controlling said hard copy generating means to produce hard copies of information selectively reproduced from said erasable recording medium.

7. Apparatus in accordance with claim 6, said recorder at said sending station comprising a magnetic recorder, said erasable recording means at said receiving station comprising a magnetic recorder, said control means at said receiving station including means for controlling the reproduction of signals recorded on the recording medium of said magnetic recorder and means for generating images of said signals as they are reproduced, said control means including means for reproducing hard copy prints of selected of the generated image signals.

8. An automatic communication system comprising in combination with a sending station and a receiving station, signal generating means at said sending station, signal generating means at said receiving station, automatic means including means for generating and transmitting control signals between said stations for establishing a communication link between the output of said sending station and the input to said signal receiving means at said receiving station, said signal generating means including a first recorder having a recording member with recordings thereon of a plurality of information signals, means for transducing said information signals from said recordings in a pretermined order, first power means for operating said first recorder to drive said recording member relative said transducing means for reproducing said information signals, a first control for said power means, first relay means operative when activated for energizing said first control to activate said power means, recording means for said information signals at said receiving station including a second recording member and a recording transducing means, second power means for driving said receiving station recording member relative said recording transducing means to effect signal recording, second control means at said receiving station for controlling said second power means, second relay means at said receiving station operative to energize said second control means to activate said second power means and drive said recording member, means at said receiving station for generating a first control signal upon the establishment of a communication link between said stations and transmitting said first control signal to said sending station, said first relay being responsive to said first control signal to operate said sending station recorder, and means at said receiving station operative upon the generation of said first control signal for activating said control for said receiving station recorder whereby information signals generated at said sending station and transmitted to said receiving station are recorded along predetermined lengths of the recording member of said receiving stations.

9. Apparatus in accordance with claim 8, including third relay means at said receiving station for deactivating the power means of said second recorder to stop movement of the recording member thereof, and means for activating said third relay means after transmission of a predetermined number of said information signals to said recording means of said receiving station.

10. Apparatus in accordance with claim 9, including relay means at said sending station for deactivating the control means for said first power means to stop the operation of its recorder upon the reproduction and transmission of a predetermined number of information signals.

11. Apparatus in accordance with claim 10, including stop-control recordings on the recording member of said sending station positioned for indicating when said predetermined number of recordings have passed said transducing means, means for transducing and utilizing signals generated from said stop-control recordings to activate said deactivating relay means.

12. An automatic communication system comprising in combination with a sending station and a remote receiving station coupleable to receive signals from said sending station, automatic means for establishing a communication link between said sending and said receiving station, signal transmitting means at said sending station, an information signal generating means at said sending station operatively connectable to said signal transmitting means for generating a plurality of information signals, said signal generating means comprising an erasable recorder having recorded thereon a plurality of document recordings, reproduction scanning means, conveying means for said recordings, servo means for operating said conveying means to present individual recordings in the scanning field of said reproduction scanning means, control means for activating and deactivating said servo means and said scanning means, said control means including first coded relay means, means at said receiving station for generating a first code signal, a receiving means at said sending station, transmitting means at said receiving station operatively connected to said first code signal generating means for transmitting said code thereto, said first coded relay means at said sending station being operatively connected to said receiving means thereat and being responsive to said first code signal to effect the operation of said conveying means and the scanning of said information signal recordings by said scanning means, means at said sending station operatively connected to said scanning means for transmitting picture signals generated thereby to said receiving station, a recording means at said receiving station operatively connected to receive picture signals, said receiving station recording means including a recording transducing means, a recording medium and means for conveying said recordinng medium past said recording transducing means, means for relatively driving said recording medium and said recording transducing means, power means, means for controlling said power means, and a second coded relay means located at said receiving station and operative, when activated, for controlling said means for driving said recording medium to position a section of said recording medium in the scanning field of said recording transducing means, means at said sending station for generating a recording control code and for transmitting said control code to said receiving station, said recording transducing means being operatively connected to the input of said receiving station and operative for transducing the information signal generated thereafter to a visual recording on said recording medium.

13. An automatic communication system in accordance with claim 12, including means for developing an image in said recording means of said receiving station, control means for said image-developing means, means at said sending station for generating a control signal after a picture signal is generated and transmitted to said receiving station and transmitting said control signal to said receiving station, and relay means at said receiving station responsive to said control signal for activating said control means for said image developing means.

14. A communication system for transmitting and receiving information in the form of electrical signals representative of information recorded on documents comprising a first station having an information signal generating means, a second station having signal recording means for recording information signals recorded thereby, each of said stations having respective signal transmitting and receiving means, means at said first station for establishing a first communication link between the transmitting means thereof and the receiving means of said second station, means operative upon establishing said communication link for establishing communication between the receiver of said first station and the sender of said second station, means at said first station for generating a call signal and for transmitting said call signal to the receiver of said second station, means at said sending station responsive to said call signal for generating a feedback signal after receiving said call signal and transmitting said feedback signal to said first station, and control means at said first station responsive to said feedback signal for activating said information signal generating means to generate information signals on the transmitter thereof, means at said second station for generating a further signal indicative of the receipt of information signals from said first station and responsive to a received information signal, and indicating means responsive to said further signal for indicating the receipt of information by said second station.

15. In a facsimile scanning system for transmitting and receiving information signals, a sender and receiver interconnected over a communication line, a signal generating means at said sender including means for automatically generating control signals and a plurality of information signals, recording means at said receiver, detecting means at said receiver for detecting receipt of information transmitted from said sender, means for connecting the detecting means to the line, means at said receiver responsive to the detection of a calling signal for transmitting a receiver ready signal to the sender, means at said sender responsive to said receiver ready signal for activating said signal generating means to generate an information signal, and means at said receiver generating a further control signal when said information signal is not received by said receiver; means for transmitting said further control signal to said sender, means at said sender responsive to said further control signal for indicating when said further control signal is received.

16. An automatic communication apparatus comprising a sending station, plural receiving stations, a communication system for operatively connecting each of said receiving stations to said sending station, signal generating means at said sending station including means for generating a plurality of first control signals and a plurality of information signals, first relay means at one of said receiving stations responsive to respective of said first control signals and operative to effect establishment of a communication link with said sending station, means for generating a feedback signal on the established communication link, second relay means at said sending station responsive to said feedback signal and operative to activate said means for generating information signals, recording means at said sending station an means at said sending station operative when said second relay means is not activated after control signals are generated and transmitted by said sending station for activating said recording means to indicate the failure to establish a communication link with said one receiving station.

17. A signal communication system including a signal sending station having information signal generating means including card scanning means, a plnrality of receiving stations for receiving information from said sending station, information provided on a plurality of record cards, card handling means for placing various cards in the scanning field of said card scanning means, means for controlling said information signal generating means to scan the cards presented in its scanning field for generating information signals, control means for controlling the transmission of selected information to selected ones of said receiving stations, said control means including means for generating a plurality of selection code signal elements, means for using said code signal elements for coupling the output of said information signal generating means with selected receiving stations, said code generating means and said card handling means being operative where a communication link is established between said sending station and a selected receiving station prior to controlling said card scanning means so as to scan a predetermined card.

18. An information transmission system comprising in combination with a video monitor means including an image screen on which visual presentations of information may be generated, an information signal generating means including video scanning means for a plurality of record card members each of which card members contains a plurality of document image recordings, said video scanning means being operative for generating video picture signals representative of document image recordings scanned, means for operatively connecting said video scanning means to said video monitor means, card handling means for presenting various cards to said video scanning means, control means for said card handling means and operative to present selected cards to be scanned to said video scanning means, said cards having identifying means for identifying different record cards, input means for operating said control means in response to the characteristics of said identifying means to effect the presentation of selected cards to said vido scanning mean whereby the document image signals of the selected cards may be scanned to generate video picture signals, and means for controlling said card handling and scanning means to cause said scanning means to scan selected of the plurality of document image recordings on a card fed to said scanning means for generating selected video picture signals and transmitting said signals individually to said monitor means.

19. A system in accordance with claim 18, whereby said document image recordings are in the form of separate film images, each of which is separately scannable, said video scanning means comprising a cathode ray tube scanning device operative for selectively scanning the film images provided on a card presented thereto.

20. In a communication system having a first signal sending means including means for generating first information signals, a receiving station for receiving and recording said signals and an automatic switching system including means for connecting said sending means with said receiving station and connecting other sending means with said receiving station whereby said receiving station may not always be connectable to receive said first information signals when the input thereto is in use, the improvement which comprises, means for recording said information signals, means at said first sending means for recording switching and connection signals operative for activating said switching system to connect said sending station with said receiving station when the line thereof is not in use, means for reproducing said switching signals a plurality of times and transmitting same to said switching system until a connection is made to said receiving station, means operatively coupled to said information signal generating means for reproducing said information signal and control means operative upon the completion of a circuit to said receiving station to effect reproduction of said information signal and its transmission to said receiving station.

21. A communication system in accordance with claim 20, wherein said means for generating first information signals comprises a card reading means and means for feeding cards containing selected information recordings to said reading means, said switching and connection signals being recorded on said cards, said card reading means including means for reproducing said switching and connection signals and further means for scanning said cards to generate said information signals.

22. A signal communication system including a signal sending station having information signal generating means including a video scanner, a plurality of receiving stations for receiving information from said sending station, a plurality of record cards, card handling means for placing various cards in the scanning field of said video scanner, means for controlling said video scanner to scan the cards presented in its scanning field for generating information signals, control means between said sending station and said receiving stations for controlling the transmission of selected information to selected ones of said receiving stations, said control means including means for generating a plurality of selection code signal elements for operatively coupling said scanner and selected receiving stations, said code signal generating means being synchronized in its operation to the operation of said card handling means whereby a communication link is established between said sending station and a selected receiving station prior to controlling said video scanner to scan a predetermined card.

23. A communication system operative to transmit information recorded on a plurality of record cards comprising:

a sending station, a plurality of receiving stations, an automatic switching and connection system for connecting said sending station with selected of said receiving station, card reading means for reading information recorded on selected cards fed to said reading means, means for generating a plurality of tone signals representative of coded information read from said cards, means controlling operation of said automatic switching and connection system to connect the output of said sending station with a selected of said receiving stations, means operative upon connecting said sending station and a selected receiving station for causing said card reading means to read selected information from selected cards to generate selected tone signals, means for transmitting the tone signals generated in reading selected cards on the connected line to said selected receiving station, a plurality of tone signal responsive relay means at said selected receiving station operatively connected to the input thereof and said connected line and each responsive to a different tone signal generated by said card reading means, and recording means at said receiving station for recording information received from said sending station, said receiving station recording means being operatively connected to at least certain of said tone signal responsive relay means at said receiving station to initiate the recording of information generated thereafter at said sending station and transmitted to said receiving station.

24. A communication system in accordance with claim 23, including a recorder operatively connected to the input of said receiving station for recording information received thereby from said sending station, and at least one of said tone signal responsive relay means being operative to control the operation of said recorder to record information generated in feeding a card to said reading means.

25. A communication system in accordance with claim 23, including further tone generating means at said receiving station operatively connected to at least one of said tone signal responsive relay means to generate a control tone signal upon the activation of said relay means, means for transmitting said control tone signal as a feedback signal to said sending station on the connected line, and means at said sending station responsive to said feedback tone signal for automatically controlling said card reading means to read information recorded on the card fed to said reading means.

26. A communication system for predeterminately distributing information comprising:

an information sending station, a first magnetic recorder at said sending station, a plurality of receiving stations, a magnetic recorder at each of said receiving stations, a communication network including means for automatically connecting said sending station with selected of said receiving stations, first means at said sending station for generating different code signals representative of respective of said receiving stations, means at said sending station for recording said code signals at predetermined locations of the magnetic recording medium of said recorder, means at said sending station for generating electrical signals representative of different messages to be transmitted and means for selectively recording said message signals on the recording medium of said sending station recorder in predetermined locations with respect to respective selection code signals recorded thereon whereby each selection code signal may be reproduced in advance of the reproduction of one or more signals representative of message information to be transmitted to a receiving station and used to establish a connection with said selected receiving station prior to the transmission of a message signal associated therewith, magnetic pickup means associated with said sending station recorder for reproducing said code signal and message signal recordings, first control means for operating said sending station recorder to cause said pickup means to reproduce a first code signal, means for transmitting said first code signal to said communication network and using same to establish a first communication link between said sending station and a selected receiving station, further control means operative upon establishing said first communication link for operating both said magnetic recorder at said sending station to reproduce the message signals associated with said first code signal and the recorder at the receiving station connected to said sending station, and transmitting said message signal to said receiving station whereby said message signal is recorded by the recorder of said receiving station, and means operative after said message signal is completely transmitted and recorded at said receiving station for operating said recorder at said sending station to reproduce a second code signal for establishing a second communication link to a second receiving station, and means operative after the establishment of said second communication link for operating said recorder of said sending station to generate a further message signal and transmit said further message signal to said second receiving station.

27. A communication system in accordance with claim 26, said means at said sending station for generating electrical signals of different messages comprising a microphone for converting the spoken words of the operator to electrical audio signals, said microphone being operatively connected to said means for recording messages in said magnetic recorder of said sending station, said means at said sending station for generating said different code signals comprising a selectively operable signal generator for generating different code signals, said code signal generator being operatively coupled to said means for recording said code signals on the recording medium of said magnetic recorder of said sending station as controlled by the operator of said sending station.

28. In a television system for transmitting still images having camera tube means and means for selectively actuating the same to generate a video signal in response to an input optical image, a receiving station comprising means for receiving said video signal, direct viewing storage cathode ray tube means coupled to said receiving means and having storage means and display screen means for converting said video signal into a still output optical image and displaying the same for a predetermined time, means for moving a sheet of optical image-sensitive material from a first location to a third location through a second location intermediate said first and third locations in view of said output optical image, means for interrupting said input optical image during movement of said sheet, means for interrupting movement of said sheet at said second location for a predetermined time whereby said output optical image is exposed to said sheet to provide a latent image thereon corresponding to said output optical image, and means for developing said latent image to render the same visible thereby providing a hard copy of said output optical image.

29. The system of claim 28, whereby said developing means is at said third location.

30. The system of claim 29, wherein said image interrupting means comprises means for disabling said cathode ray tube thereby to interrupt the display of said output optical image.

31. The system of claim 28, wherein said image-interrupting means comprises selectively actuatable shutter means disposed on the optical path between said display screen means and said second location.

32. The system of claim 28, wherein said moving means includes means adjacent said first location for severing said sheet in a predetermined length from a supply of said material in elongated form.

33. A signal communication system comprising a signal sending station and a plurality of receiving stations, said sending station including means for generating and transmitting signals including a plurality of information elements and code signal elements, an automatic telephone switching and connection system having a first terminal circuit connected to said signal sending station and additional terminal circuits connected to respective of said receiving stations, means for applying said generated code signal elements to said switching system to effect the automatic connection of said first terminal circuit with selected ones of the other terminal circuits of the system connected to respective of said receiving stations, recording means at each of said receiving stations for receiving and storing signals transmitted on the connected lines to the terminal circuits thereof, means at said sending station for generating a control tone signal after connections have been made with said plurality of said receiving stations, said receiving station control means being responsive to said control signal and operative for use in preparing the receiving station to receive information elements, said receiving stations each having a recorder control means for receiving said control tone signal and operative in response thereto for conditioning the recording means of said stations to start recording, means at said sending station for initiating the generation and transmission of said information elements after connections have been made between said receiving stations and said sending stations and said control signal has been generated and transmitted to said receiving stations whereby the same information signal may be simultaneously transmitted to said receiving stations and recorded by the recording means of the plurality of connected receiving stations.

34. A signal communication system in accordance with claim 33, whereby said recording means at each of said receiving stations comprises a magnetic recorder having a transducer connected to the terminal circuit of the receiving station and a magnetic recording member operative to be driven past said transducer, motor means for driving the magnetic recording member past the transducer, control means for said motor means, said control means being operative to drive the motor in response to receipt of said control tone signal.

(References on following page)

References Cited

UNITED STATES PATENTS

| | | | |
|---|---|---|---|
| 1,116,949 | 11/1914 | Stille | 292—78 |
| 2,498,700 | 2/1950 | Munck | 178—4 |
| 2,522,453 | 9/1950 | Keyes | 178—4 |
| 2,902,538 | 9/1959 | Edgar | 178—2 |
| 2,951,893 | 9/1960 | Krecek | 178—4 |
| 2,967,908 | 1/1961 | Gray | 178—69 |

HOWARD W. BRITTON, Primary Examiner

U.S. Cl. X.R.

178—DIG. 1, 6.6 R; 325—64